US012494588B2

(12) United States Patent
Lange

(10) Patent No.: US 12,494,588 B2
(45) Date of Patent: Dec. 9, 2025

(54) ELLIPSOIDAL ARRAY ANTENNAS WITH MODULAR UNIT CELLS

(71) Applicant: The Aerospace Corporation, El Segundo, CA (US)

(72) Inventor: Mark J. Lange, Malibu, CA (US)

(73) Assignee: THE AEROSPACE CORPORATION, Segundo, CA (US)

(*) Notice: Subject to any disclaimer, the term of this patent is extended or adjusted under 35 U.S.C. 154(b) by 294 days.

(21) Appl. No.: 18/458,953

(22) Filed: Aug. 30, 2023

(65) Prior Publication Data

US 2025/0079719 A1 Mar. 6, 2025

(51) Int. Cl.

*H01Q 21/06* (2006.01)
*H01Q 1/36* (2006.01)
*H01Q 1/50* (2006.01)

(52) U.S. Cl.

CPC ............. *H01Q 21/061* (2013.01); *H01Q 1/36* (2013.01); *H01Q 1/50* (2013.01)

(58) Field of Classification Search

CPC ........... H01Q 21/061; H01Q 1/36; H01Q 1/50
See application file for complete search history.

(56) References Cited

U.S. PATENT DOCUMENTS

| | | | | |
|---|---|---|---|---|
| 3,364,491 A | | 1/1968 | Walter | |
| 4,792,808 A | * | 12/1988 | Hildebrand | H01Q 21/205 343/754 |
| 5,621,420 A | * | 4/1997 | Benson | H01Q 9/30 343/790 |
| 6,590,545 B2 | * | 7/2003 | McCorkle | H01Q 15/0013 343/769 |
| 6,642,903 B2 | * | 11/2003 | Schantz | H01Q 9/005 343/795 |
| 8,917,215 B2 | * | 12/2014 | Pohl | H01Q 13/06 343/753 |
| 9,293,815 B1 | * | 3/2016 | Horner | H01Q 1/36 |
| 11,005,179 B2 | | 5/2021 | Achour et al. | |

(Continued)

FOREIGN PATENT DOCUMENTS

| | | |
|---|---|---|
| CN | 1754284 A | 3/2006 |
| CN | 105356051 A | 2/2016 |

(Continued)

OTHER PUBLICATIONS

Craeye, C., & González-Ovejero, D. (2011). A review on array mutual coupling analysis. Radio Science, 46(2). https://doi.org/10.1029/2010RS004518.

(Continued)

*Primary Examiner* — Hai V Tran
(74) *Attorney, Agent, or Firm* — LeonardPatel PC

(57) ABSTRACT

Ellipsoidal array antennas that include repeated, modular unit cells are disclosed. The ellipsoidal array antennas may be wide band array antennas with bandwidths exceeding one octave that are capable of handling high radio frequency (RF) power with high polarization purity and low-cost manufacturing for arrays with high element counts. The number of unit cells is given by (Element_Rows+1)*Element_Columns for single polarized arrays. For dual polarized arrays, the number of unit cells is given by (Element_Rows+1)*(Element_Columns+1).

28 Claims, 26 Drawing Sheets

(56) References Cited

U.S. PATENT DOCUMENTS

| | | | | |
|---|---|---|---|---|
| 11,735,825 B1 * | 8/2023 | Leung | .................... | H01Q 19/08 343/702 |
| 2018/0351250 A1 | 12/2018 | Achour et al. | | |

FOREIGN PATENT DOCUMENTS

| | | | |
|---|---|---|---|
| FR | 2860884 | A1 | 4/2005 |
| WO | 2014127420 | A1 | 8/2014 |

OTHER PUBLICATIONS

Ogilvie, Timothy Bryan, "A Novel Unit Cell Antenna for Highly Integrated Phased Arrays in the SHF Band", Thesis, California Polytechnic State University, San Luis Obispo, Jun. 2013.

* cited by examiner

600

610

700

710

ELLIPSOIDAL ARRAY ANTENNAS WITH MODULAR UNIT CELLS

FIELD

The present invention generally pertains to antennas, and more particularly, to ellipsoidal array antennas that include repeated, modular unit cells.

BACKGROUND

The Vivaldi or flaired-notch antennas can provide substantial impedance and radiation pattern bandwidth on a single element. However, when used in an array antenna, the radiation pattern performance bandwidth is significantly reduced due to the large size of the element forcing large element spacing and serious grating lobes at the higher frequencies when scanned. Furthermore, when used in a dual polarization mode, the feed point of the orthogonal polarized flaired notches cross over one another in the center of the notch, forcing a difference in the height of the two feed lines and requiring a fairly large gap and subsequently large parasitic inductance. This causes unbalanced currents on the flaired notches, which reduces bandwidth and increases cross polarization of the radiated fields. Such effects are undesirable when used in a wideband antenna array. Accordingly, an improved and/or alternative solution may be beneficial.

SUMMARY

Certain embodiments of the present invention may be implemented and provide solutions to the problems and needs in the art that have not yet been fully solved by existing antenna technologies. For example, some embodiments pertain to ellipsoidal array antennas that include repeated, modular unit cells. Individual unit cells may be manufactured and connected in an array of any desired size or aperture shape. A single unit cell will not radiate, but any number of two or more unit cells, whether odd or even, will radiate.

In an embodiment, an ellipsoidal array antenna unit cell includes an ellipsoidal radiator including a coaxial connector center conductor and a radio frequency (RF) conductor. The ellipsoidal array antenna unit cell also includes a cylinder located below and operably connected to the ellipsoidal radiator and a first connector that originates from between the ellipsoidal radiator and the cylinder. The first connector is operably connected to the coaxial connector center conductor and the RF conductor. The first connector extends beyond a width of the ellipsoidal array antenna unit cell. The first connector is configured to connect the ellipsoidal array antenna unit cell to another ellipsoidal array antenna unit cell.

In another embodiment, a modular ellipsoidal array antenna unit cell includes an ellipsoidal radiator including a coaxial connector center conductor and an RF conductor. The modular ellipsoidal array antenna unit cell also includes a cylinder located below and operably connected to the ellipsoidal radiator. The modular ellipsoidal array antenna unit cell further includes a unit cell ground plane operably connected to the cylinder. Additionally, the modular ellipsoidal array antenna unit cell includes a first connector that originates from between the ellipsoidal radiator and the cylinder. The first connector is operably connected to the coaxial connector center conductor and the RF conductor. The first connector extends beyond a width of the modular ellipsoidal array antenna unit cell. The first connector is configured to connect the modular ellipsoidal array antenna unit cell to another modular ellipsoidal array antenna unit cell. A difference between a width of the modular ellipsoidal radiator and the unit cell ground plane defines a smallest gap between the modular ellipsoidal array antenna unit cell and the adjacent modular ellipsoidal array antenna unit cell at a location of a feed point of the first connector.

In yet another embodiment, an ellipsoidal array antenna unit cell includes an ellipsoidal radiator comprising a coaxial connector center conductor, a first RF conductor, and a second RF conductor. The ellipsoidal array antenna unit cell also includes a cylinder located below and operably connected to the ellipsoidal radiator. The ellipsoidal array antenna unit cell further includes a first connector and a second connector. The first connector and the second connector originate from between the ellipsoidal radiator and the cylinder. The first connector and the second connector are operably connected to the coaxial connector center conductor and to the first RF conductor and the second RF conductor, respectively. The first connector and the second connector extend beyond a width of the ellipsoidal array antenna unit cell. The first connector is configured to connect the ellipsoidal array antenna unit cell to another ellipsoidal array antenna unit cell. The second connector is configured to connect the ellipsoidal array antenna unit cell to yet another ellipsoidal array antenna unit cell.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1A:
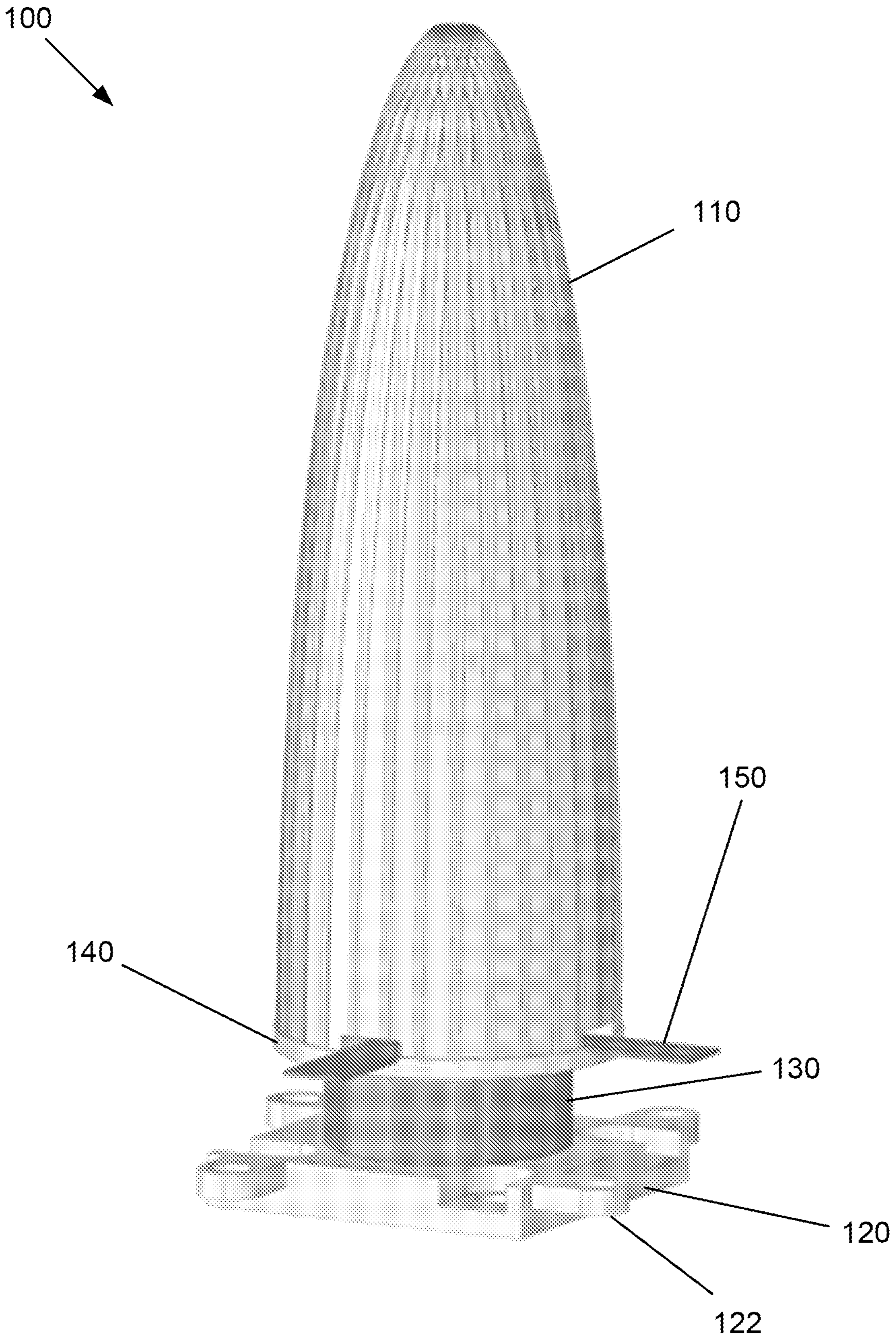
FIG. 1A is a perspective view illustrating an ellipsoidal antenna unit cell, according to an embodiment of the present invention.

Some embodiments of the present invention pertain to ellipsoidal array antennas that include repeated, modular unit cells. In certain embodiments, the ellipsoidal array antennas are wide band array antennas with bandwidths exceeding one octave. Such embodiments may be capable of handling high radio frequency (RF) power (e.g., greater than 200 watts (W) per antenna element) with high polarization purity (e.g., cross-polarization rejection greater than 25 decibels (dB) and low-cost manufacturing for arrays with high element counts. Such embodiments may be used for various applications including, but not limited to, ground systems for satellite communication, aircraft, satellites, cellular communications to provide wider bandwidth (phased arrays can have multiple beams from large array), etc.

The number of unit cells is given by (Element_Rows+1) *Element_Columns for single polarized arrays. For dual polarized arrays, the number of unit cells is given by (Element_Rows+1)*(Element_Columns+1). For example, a single linear polarized array of 8×1 elements uses 9 unit cells. The unit cell in some embodiments is configured in such a way that a plurality of unit cells can be assembled in any desired number of rows or columns. If the rows and columns differ in size across the array, the above equations should be used to sum up the different parts of the array.

The ellipsoidal radiator of some embodiments provides equal E-plane and H-plane beamwidths and low cross polarization at any phi (ϕ) angle. The shape of such a radiator eliminates nearly all of the parallel plate regions with high RF power, thus eliminating the multipactor effect at low RF power thresholds. Certain embodiments separate out the vertical and horizontal feeds such that they are in-line with the centers of the ellipsoids and adjacent ellipsoid radiators are in close proximity to one another where they meet the feed line, thus producing very low parasitic inductance and balanced currents and enabling low cross polarization and bandwidths that exceed one octave.

The connection can be a microstrip line, a coaxial cable center conductor, or a strip line that line spans the small gap between the base of two adjacent ellipsoids in some embodiments may be short circuited or open circuited (e.g., a quarter wave open stub at mid band). Thus, there are six possible ways of connecting two unit cells in some embodiments. The ability to implement a short circuit stub eliminates floating metal, preventing charge build-up when deployed in a space system, for example. The ellipsoid radiator of some embodiments further enables the element-to-element spacing to be approximately 0.5-0.6 wavelengths at the highest operating frequency and approximately 0.25-0.3 wavelengths at the lowest operating frequency, thus effectively eliminating grating lobes during beam scanning.

In some embodiments, the unit cell can be manufactured out of just two diecast parts, enabling high volume manufacturing for arrays with very large element counts (e.g., hundreds, thousands, tens of thousands, etc.). A larger element count adds more antenna gain, and designs can be scaled up or down to any frequency band of interest. Indeed, come embodiments may provide full octave bandwidth or more.

Some embodiments have various benefits and advantages over existing antenna elements and arrays. For instance, the ellipsoidal radiator element of some embodiments provides wide impedance and gain bandwidths, as well as equal orthogonal beamwidths. The unit cell design may be modular, which lends itself to reconfigurable array sizes and aperture shapes. Also, modular unit design may facilitate manufacture via by high volume diecasting, facilitating lower cost arrays with large element counts. Separated orthogonal feed points may provide low parasitic inductance that enables wide bandwidth, provide balanced currents that enable low cross polarization, provide good cross polarization between orthogonal feeds, eliminate cross over points, and/or enable feeds to be at the same physical and electrical length above ground. Using short circuit or open circuit feed lines provides design flexibility, where the short circuit feed design eliminates floating metal and subsequent charge buildup. Designs of some embodiments may also provide few or no parallel plate regions with high RF power. The high RF power may be supported without multipacting in a vacuum.

Figure 1B:
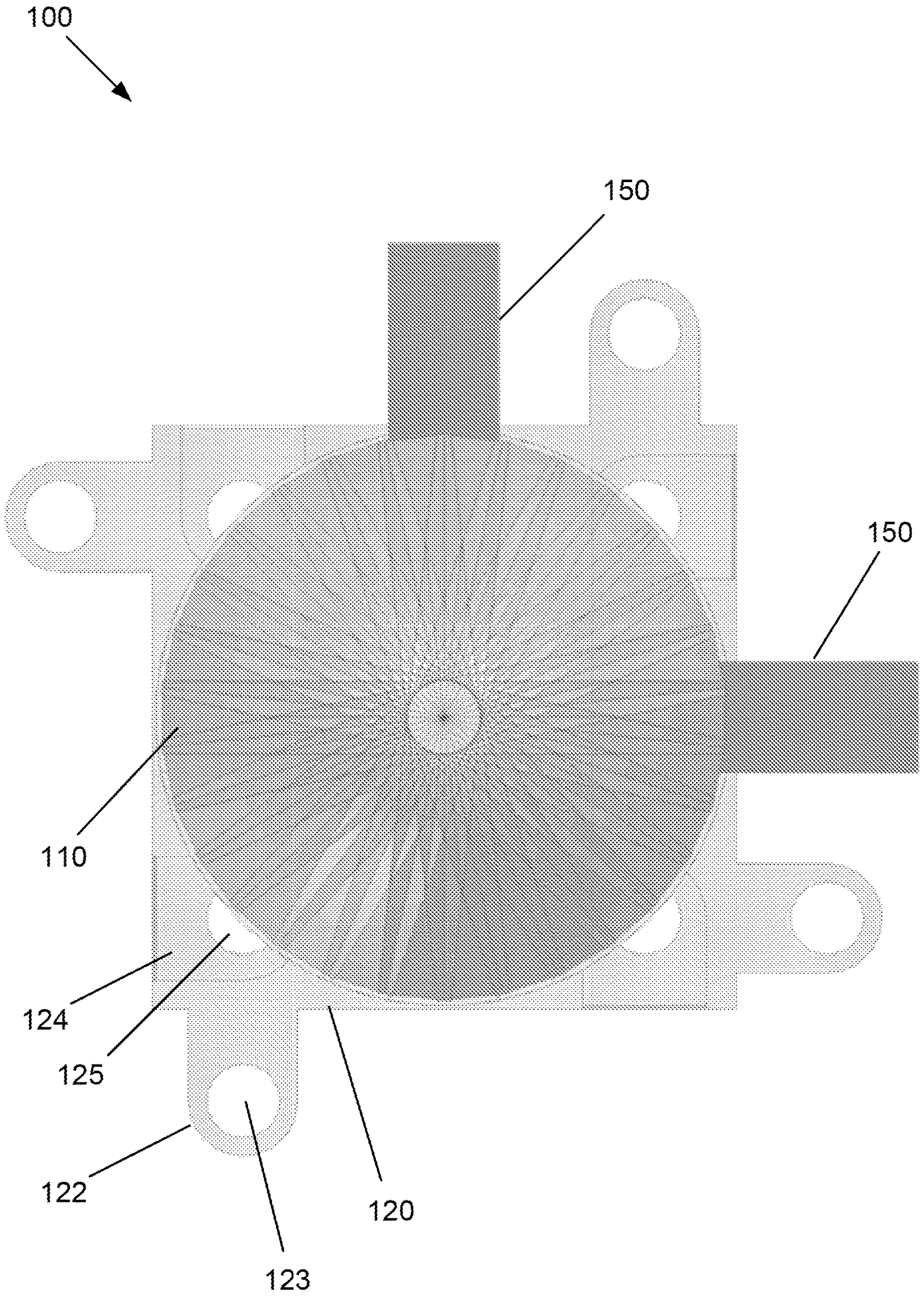
FIG. 1B is a top view illustrating the ellipsoidal antenna unit cell, according to an embodiment of the present invention.
Figure 1C:
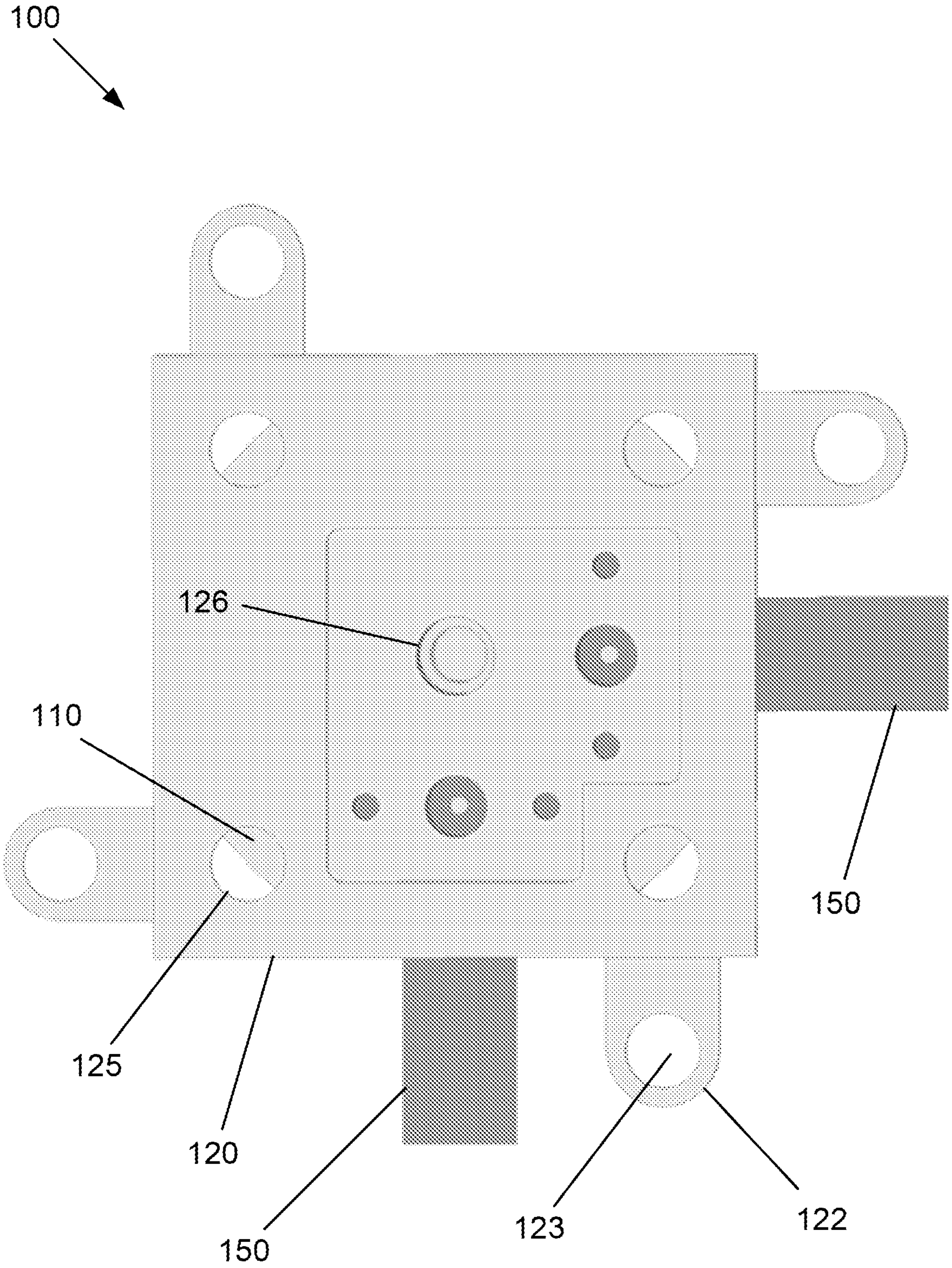
FIG. 1C is a bottom view illustrating the ellipsoidal antenna unit cell, according to an embodiment of the present invention.

FIGS. 1A-C illustrate perspective, top, and bottom views, respectively, of an ellipsoidal antenna unit cell 100, according to an embodiment of the present invention. Ellipsoidal antenna unit cell 100 includes an ellipsoidal radiator 110 (see also FIG. 1H), a unit cell ground plane 120 (see also FIGS. 1D and 1E), a lower cylinder 130 (see also FIG. 1F), and an upper cylinder 140 (see also FIG. 1G). Ellipsoidal antenna unit cell 100 further includes at least one small microstrip 150 (two in this embodiment) that originates from between ellipsoidal radiator 100 and upper cylinder 140 that extends beyond the width of ellipsoidal antenna unit cell 100. Microstrip 150 includes a microstrip line 152 and a substrate 154 (see FIGS. 1I and 1J, for example). However, it should be noted that a microstrip feed, a coaxial cable, a strip line, or any other suitable component for connecting unit cells may be used in some embodiments.

Microstrip 150 is soldered to a coaxial connector center conductor (see FIGS. 2C and 2D) below ellipsoidal radiator 110. A central assembly bolt hole 126 and smaller mounting holes 129 for each RF connector (not shown) of a plurality of RF connectors are located on each side of hole 128, along with bolt holes 123, 125 for assembly with a plurality of other unit cells.

An antenna cell in some embodiments, such as ellipsoidal antenna unit cell 100, can be assembled with any desired number of similar or identical unit cells to make up one or more elements of an array antenna. The difference between the width of ellipsoidal radiator 110 and unit cell ground plane 120 defines the smallest gap between adjacent unit cells at the location of the feed point. A functional element requires at least two antenna unit cells. It should be noted that while the embodiment of FIGS. 1A-H include four machined parts that may be assembled together with machine screws, two RF connectors, and two small microstrip lines, in some embodiments, the four machined parts may be replaced with just two diecast parts, facilitating low cost, high element count array antennas.

In two-part embodiments, the two lower discs and the ground plane could be diecast into a single part. This part could then be bolted to the ellipsoids. In certain embodiments, all diecast parts could be fabricated in one single part using additive manufacturing (AM) processes, such as selective laser sintering (SLS) of an aluminum powder.

Figure 1D:
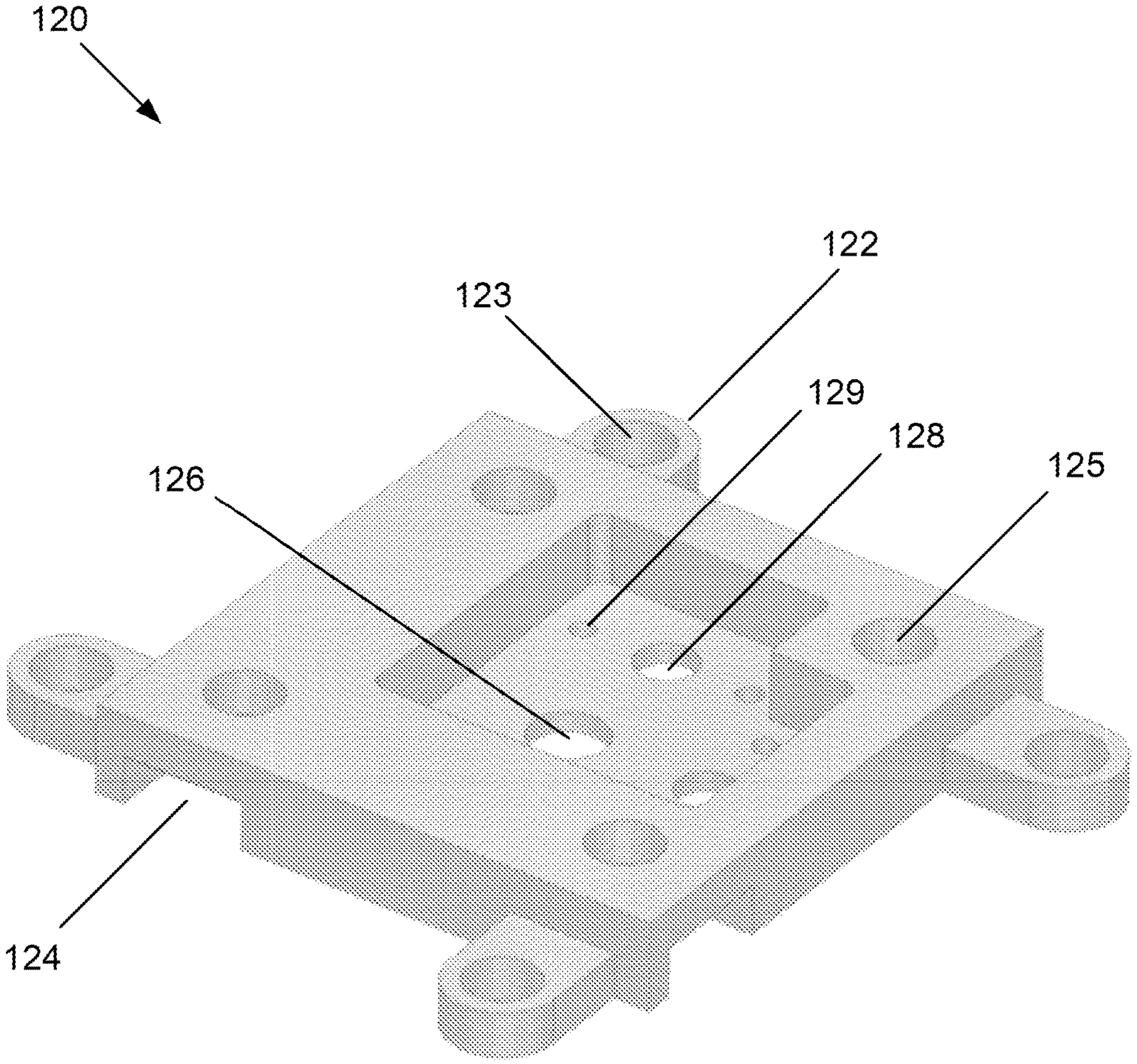
FIG. 1D is a bottom perspective view illustrating a unit cell ground plane of the ellipsoidal antenna cell, according to an embodiment of the present invention.
Figure 1E:
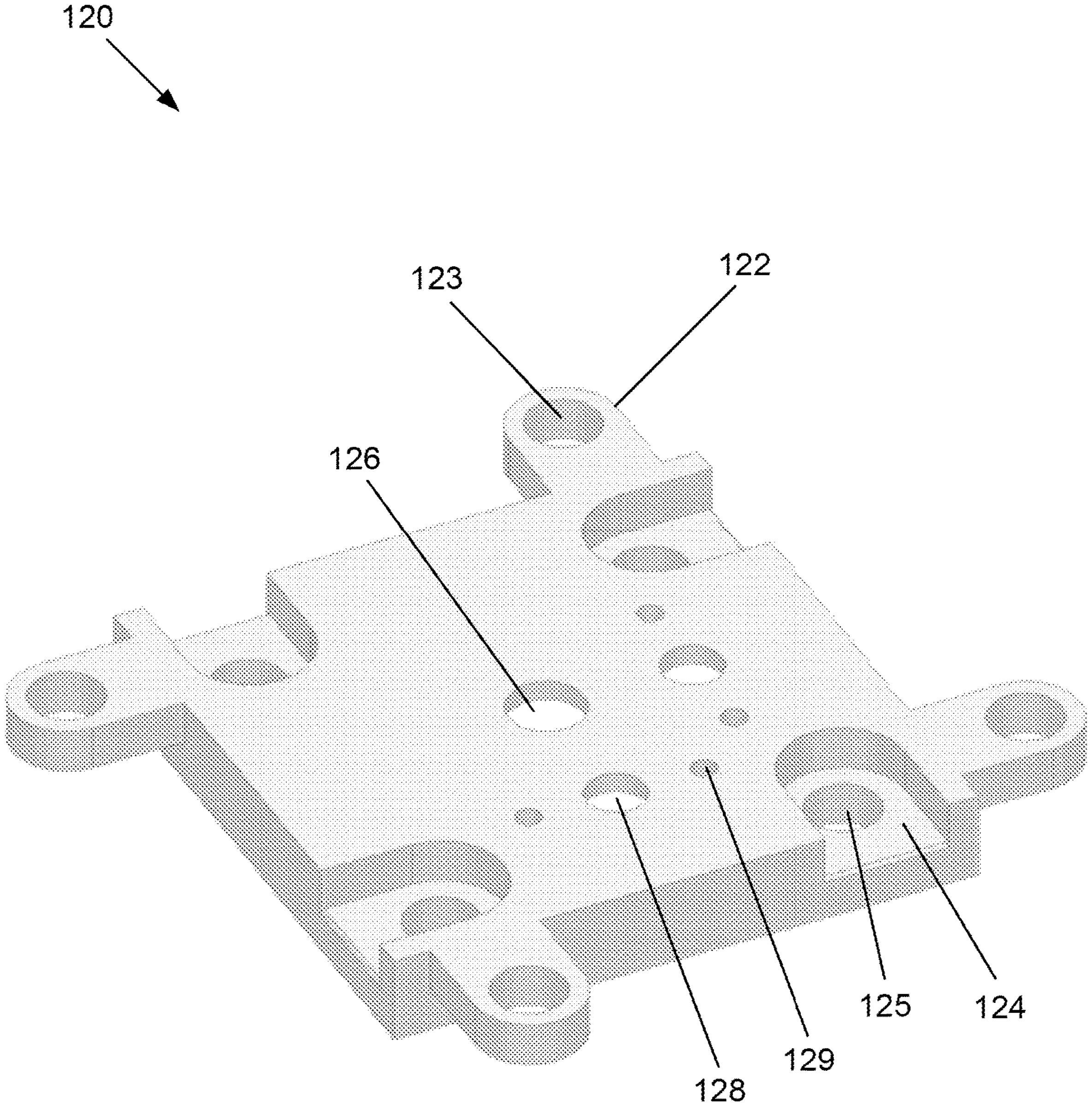
FIG. 1E is a top perspective view illustrating a unit cell ground plane of the ellipsoidal antenna cell, according to an embodiment of the present invention.
Figure 1F:
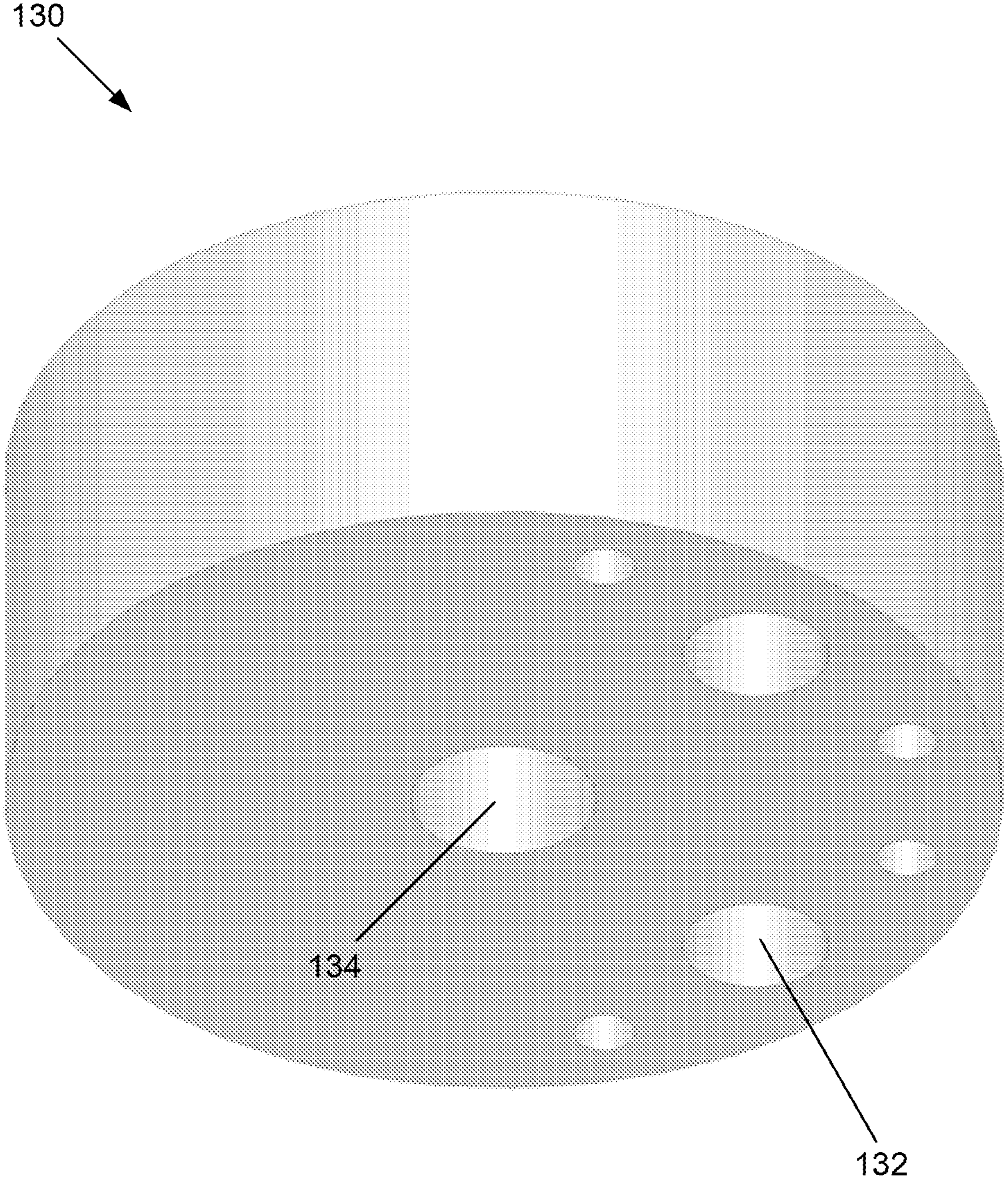
FIG. 1F is a perspective view illustrating a lower cylinder of the ellipsoidal antenna cell, according to an embodiment of the present invention.

Turning to FIGS. 1D and 1E, unit cell ground plane 120 includes four sets of flanges 122 and recesses 124 that are identically duplicated four times around the central axis of ellipsoidal antenna unit cell 100 in this embodiment. Flanges 122 and recesses 124 enable any desired number of antenna unit cells to be connected together to form the elements of the array antenna. Turning to FIG. 1F, lower cylinder 130 includes through holes 132 that pass the dielectric and center conductor of a plurality of RF coaxial connectors (not shown), well as a center through hole 134 for the center conductor. Lower cylinder 130 further supports mounting of the RF connectors. In this embodiment, lower cylinder 130 is smaller in diameter than ellipsoidal radiator 110, thus forming part of a small cavity that is completed when multiple unit cells are combined.

Figure 1G:
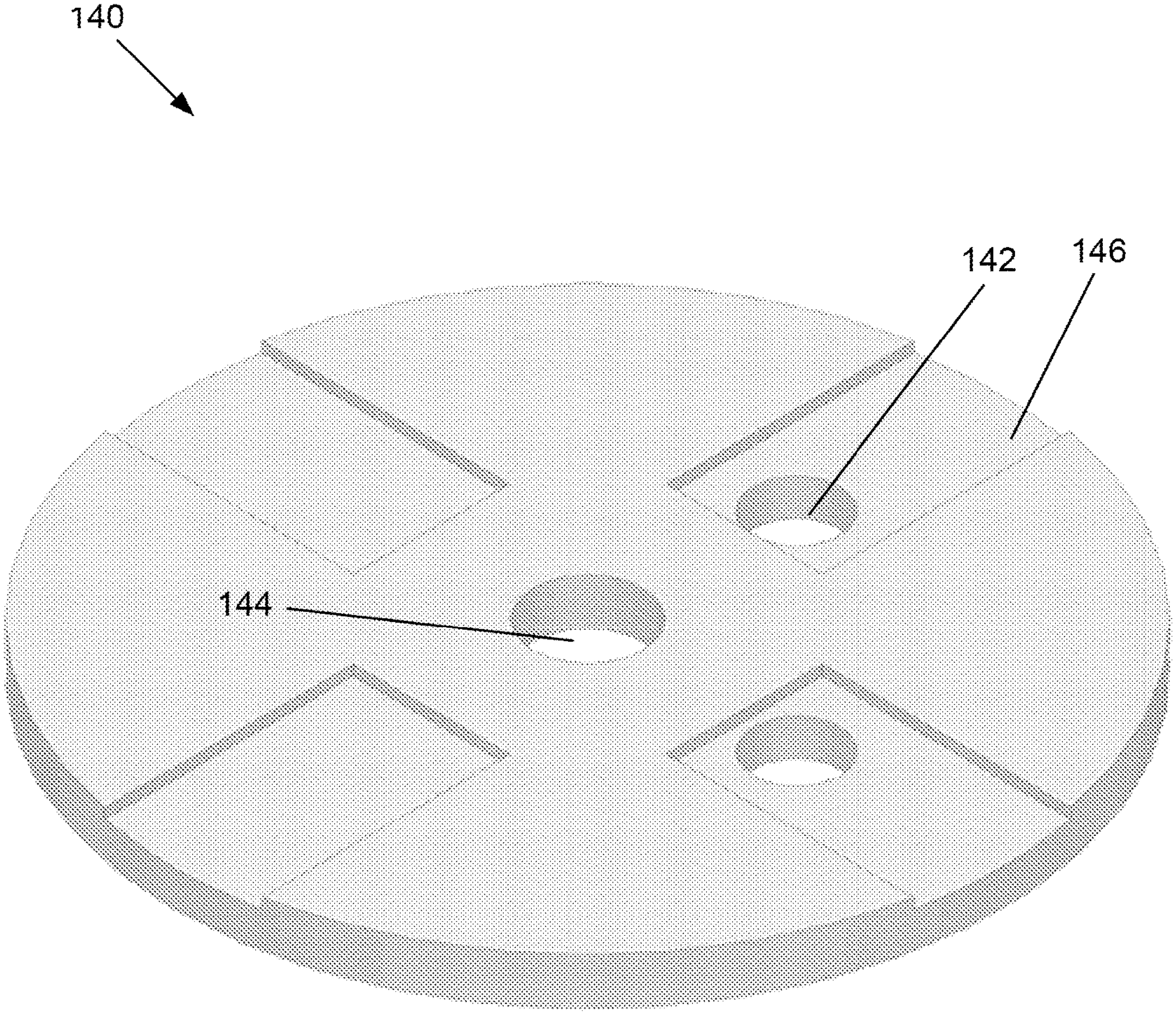
FIG. 1G is a perspective view illustrating an upper cylinder of the ellipsoidal antenna cell, according to an embodiment of the present invention.

Turning to FIG. 1G, upper cylinder 140 includes through holes 142 for coaxial connector dielectrics and a center through hole 144 for the center conductor. In this embodiment, two through holes 142 holes meet up with respective rectangular recesses 146 that receive microstrip 150. Through holes 142 for the coaxial connectors, along with center through hole 144, are used for alignment of microstrip 150 with the connectors. It should be noted that in some embodiments, lower cylinder 130 and upper cylinder 140 may be fabricated as a single part.

Figure 1H:
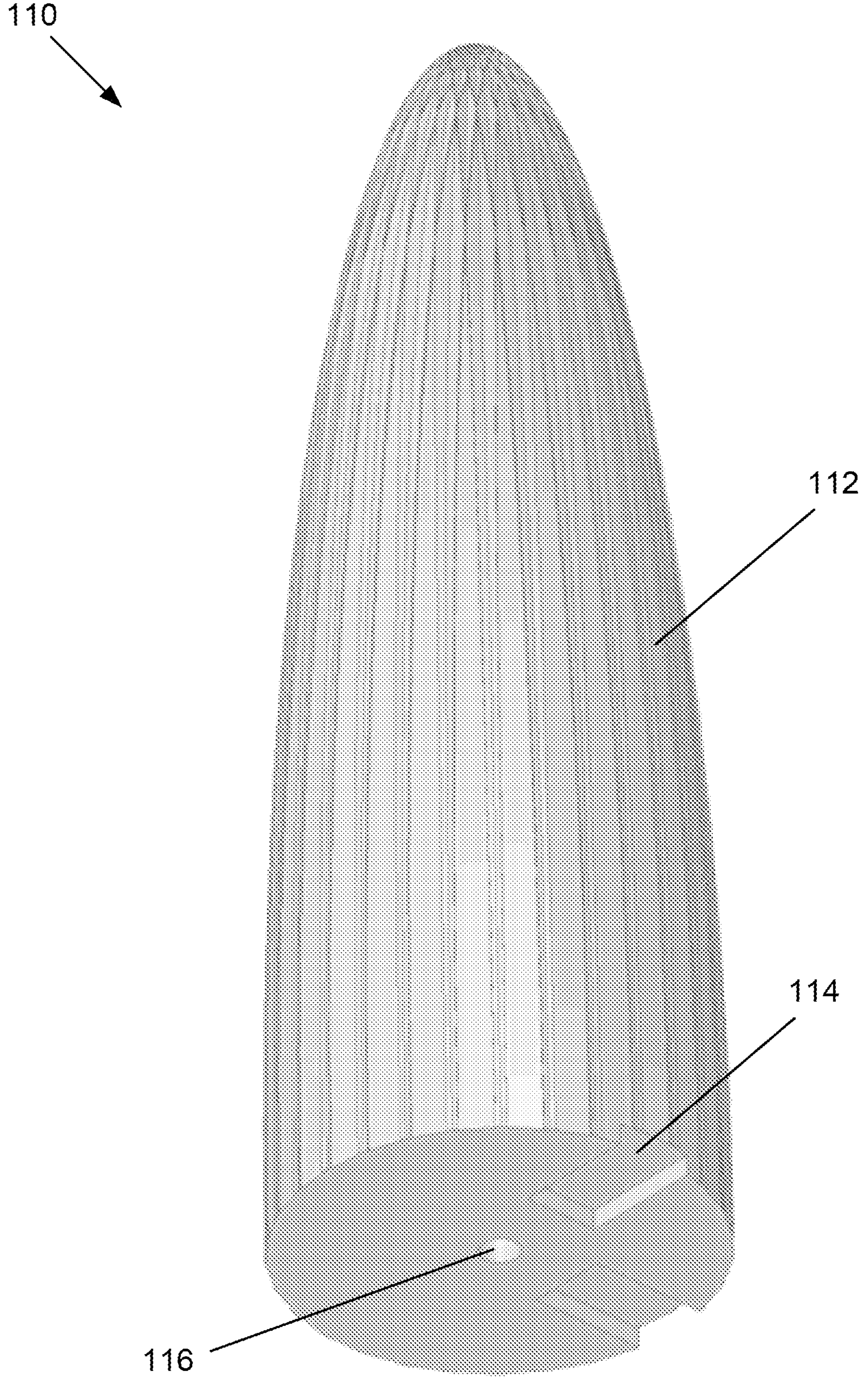
FIG. 1H is a perspective view illustrating an ellipsoidal radiator of the ellipsoidal antenna cell, according to an embodiment of the present invention.

Turning to FIG. 1H, the exterior of ellipsoidal radiator 110 can be smooth or include small facets 112, as shown here. The interior of ellipsoid radiator 110 may be hollowed out to remove excess and unnecessary material and to reduce mass without affecting the function of ellipsoidal antenna unit cell 100. The bottom side of ellipsoidal radiator 110 interfaces with the top side of upper cylinder 140. Recesses 114 provide the relief needed for clearance above microstrip 150. Additional relief of the interior of ellipsoidal radiator 110 may be provided to the point that a thin shell is formed with a thickness only as provided by the selected manufacturing process in certain embodiments. For example, a diecast aluminum part may require walls typically as thick as 0.090 inches, whereas a deep drawn aluminum ellipsoid may only require walls as thick as 0.040 inches.

In this embodiment, two orthogonal recesses 114 are located directly above ends of two orthogonal linear polarized microstrip 150. The opposite sides of the ellipsoidal perimeter do not have recesses such that the ellipsoid perimeter provides the short circuit at the terminating end of microstrip lines 152 of microstrip 150. In certain embodiments that implement a quarter wavelength open circuit stub at the terminating end of microstrip line 152 would use two additional orthogonal recesses (not shown) in the perimeter of ellipsoidal radiator 110.

It should be noted that the faceted surface of ellipsoidal radiator 110 is shown for simulation purposes, and the surface may be smooth in some embodiments. Also, while shown as solid, ellipsoidal radiator 110 may be fabricated from a hollow shell using a wide variety of manufacturing techniques. These manufacturing techniques include, but are not limited to, manufacturing on a lathe, die-casting, AM processes, etc.

Figure 1I:
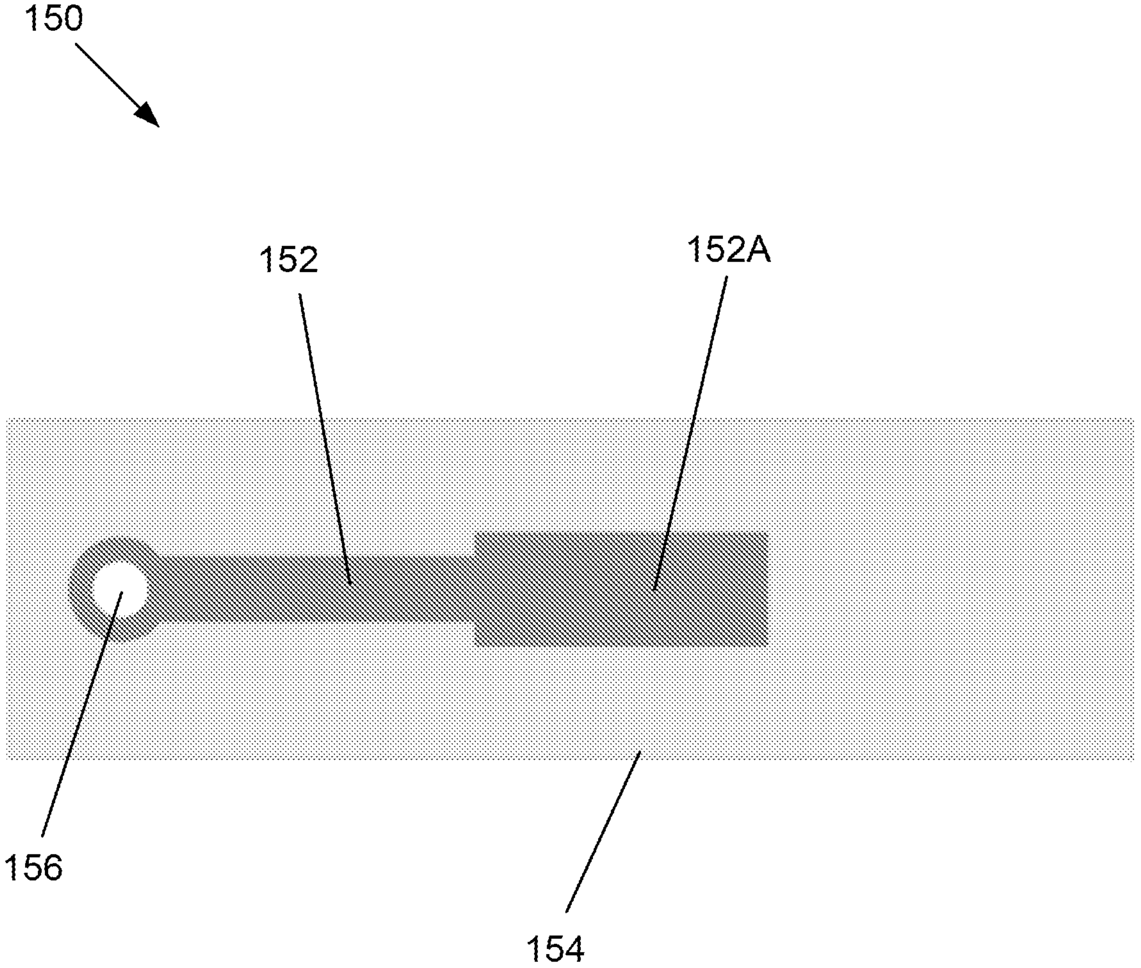
FIG. 1I is a top view illustrating a portion of a microstrip line, according to an embodiment of the present invention.
Figure 1J:
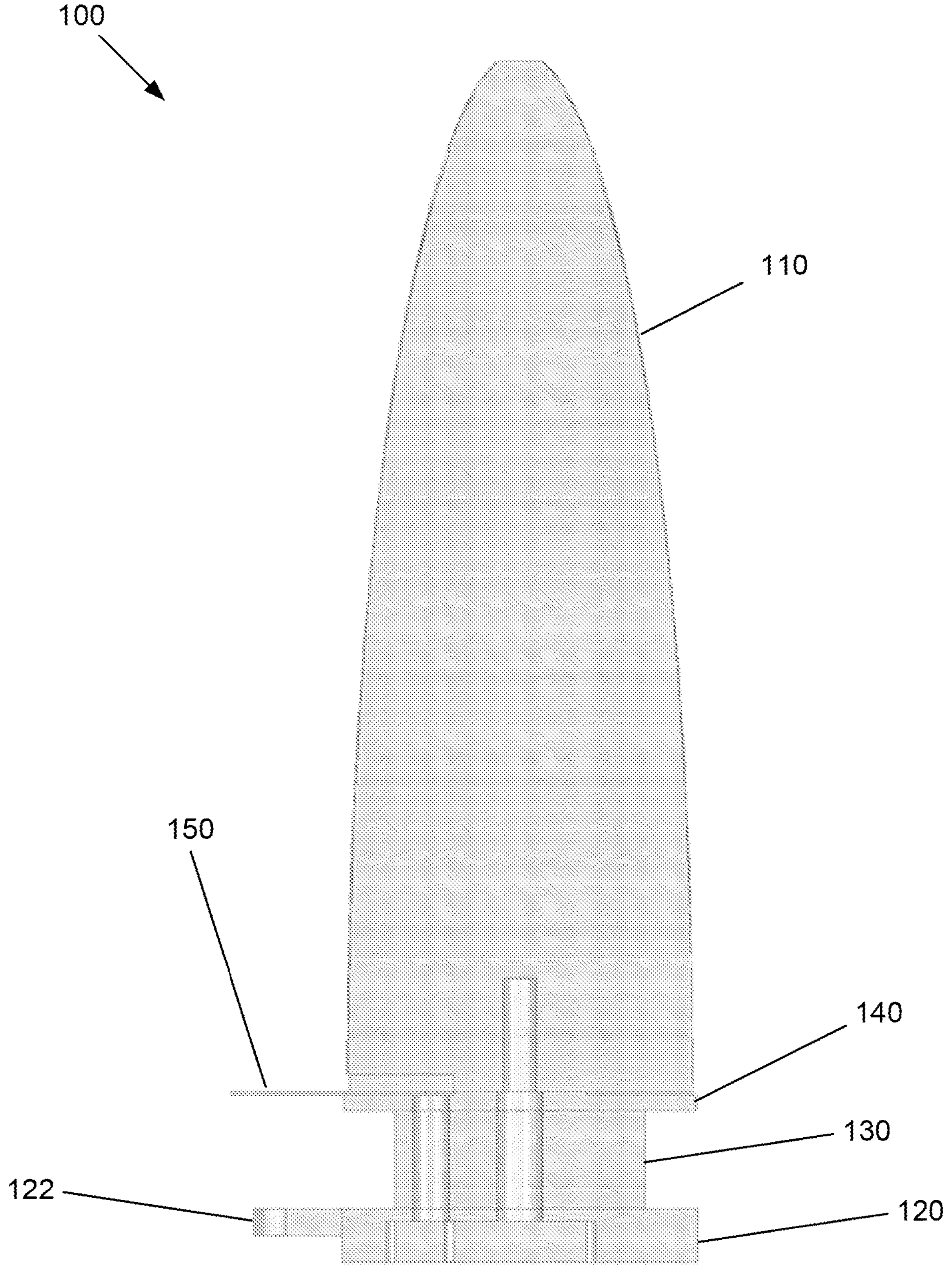
FIG. 1J is a side view illustrating the ellipsoidal antenna unit cell with connectors and bolts removed, according to an embodiment of the present invention.

Turning to FIG. 1I, microstrip 150 includes microstrip line 152 (darker gray portion) on substrate 154 (lighter gray portion). A hole 156 allows microstrip 150 to be attached to upper cylinder 140 via respective through holes 142 in recesses 146 (e.g., by a screw). Microstrip line 152 may have a characteristic impedance of approximately 50 Ohms in some embodiments. The width of portion 152A of microstrip line 152 is increased as it exits the perimeter of the ellipsoid to reduce residual parasitic inductance as it crosses the gap to an adjacent ellipsoid. The short open circuited stub offset from the holes (i.e., 126, 134, 144, 116) for the coaxial connector center conductor is used to fine tune the antenna impedance and compensate for unanticipated tolerances, if necessary. While not shown, in some embodiments, microstrip 150 may support the insertion of a low noise amplifier or high power amplifier, providing a low noise antenna temperature or high efficiency transmitter.

Figure 2A:
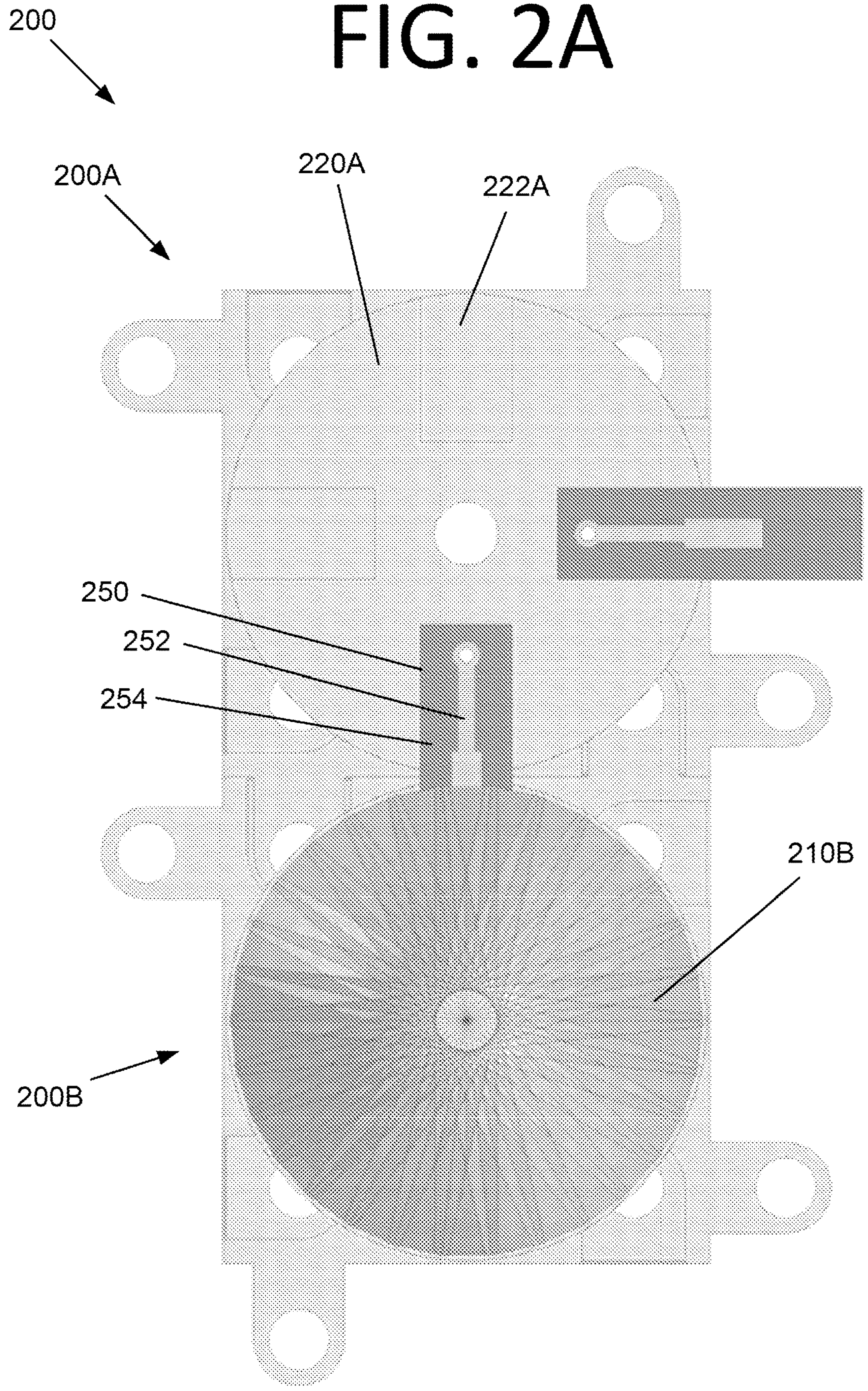
FIG. 2A is a top view illustrating a single polarized antenna element that includes a pair of unit cells connected by a microstrip, according to an embodiment of the present invention.
Figure 2B:
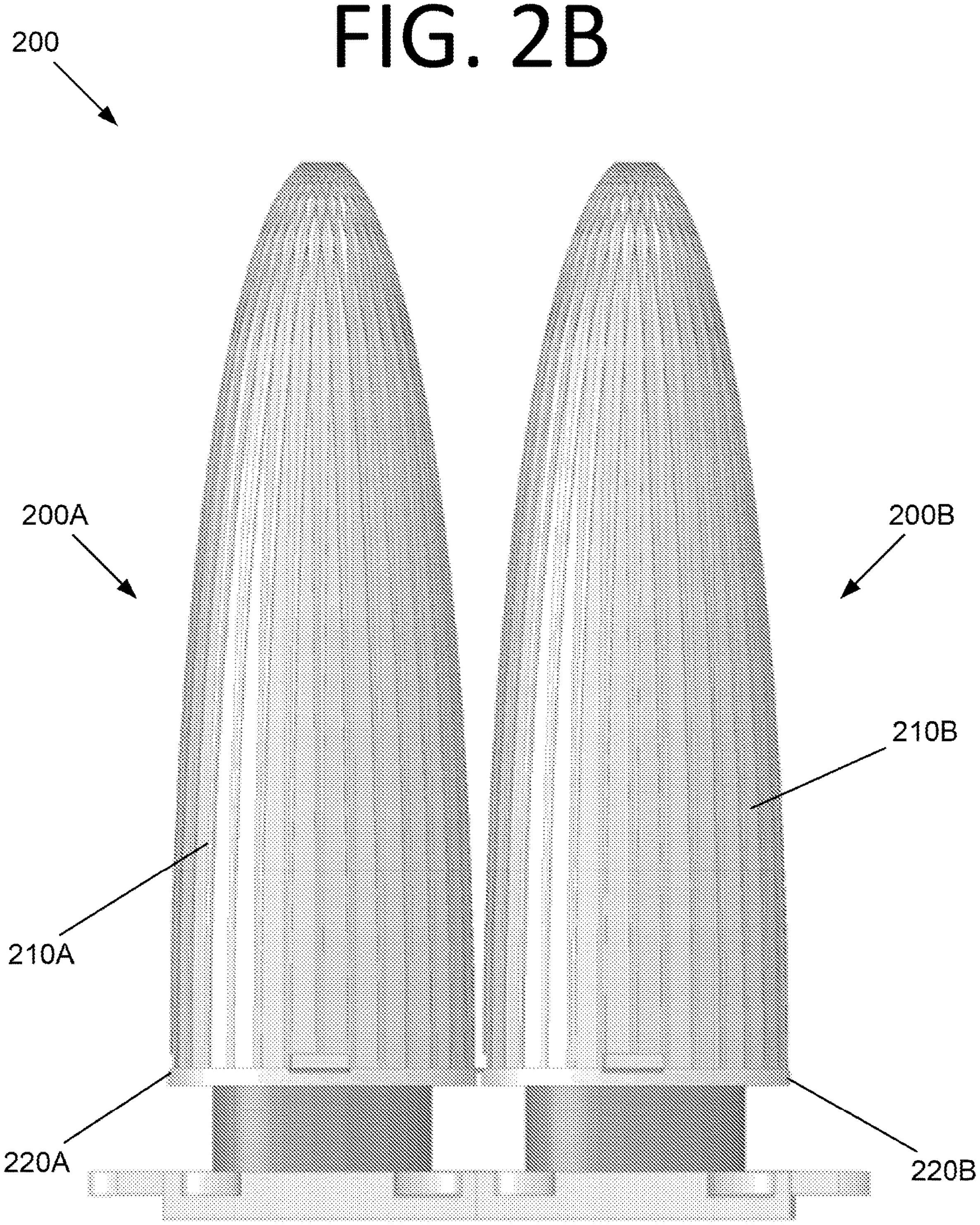
FIG. 2B is a side view illustrating the pair of unit cells, according to an embodiment of the present invention.

FIGS. 2A and 2B are top and side views, respectively, illustrating a single polarized antenna element 200 that includes a pair of unit cells 200A, 200B connected by a microstrip, according to an embodiment of the present invention. In some embodiments, unit cells 200A, 200B are ellipsoidal antenna unit cells 100 of FIGS. 1A-I. In FIG. 2A, ellipsoidal radiator 210B is visible in unit cell 200B, but has been removed in unit cell 200A to show the underlying components.

Similar to ellipsoidal antenna unit cell 100, unit cell 200A includes an upper cylinder 220A with recesses 222A. Upper cylinder 220A is connected to lower components (e.g., a lower cylinder, a unit cell ground plane, etc.). The right recess has been removed to expose a coaxial connector 240A. A center conductor 242A of coaxial connector 240A may be soldered into the microstrip line of a respective microstrip. See FIGS. 2C and 2D.

Figure 2C:
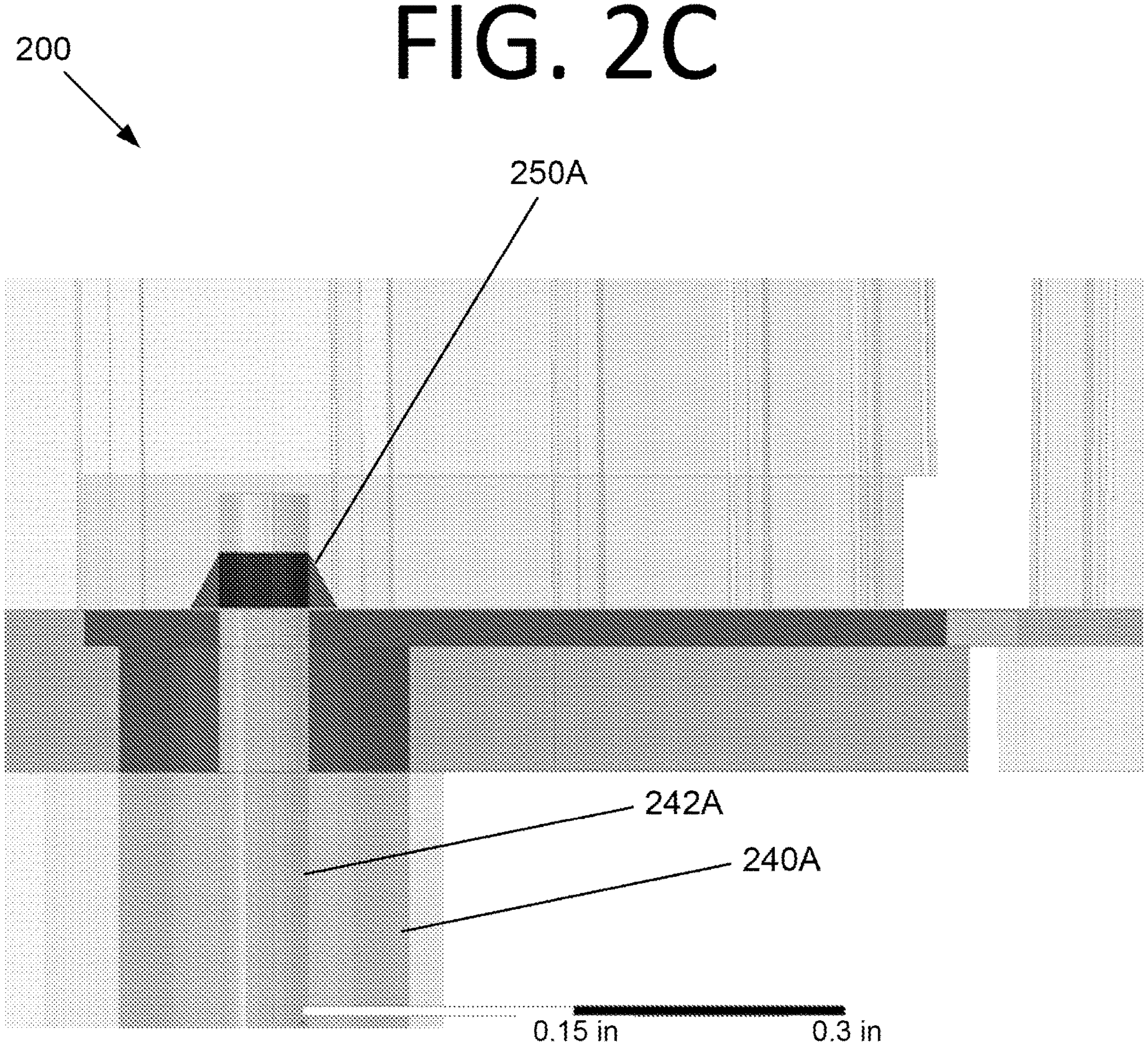
FIG. 2C is a partially transparent side view illustrating a portion of the pair of unit cells showing a black conical solder joint between the microstrip line and the gray cylindrical coaxial probe, according to an embodiment of the present invention.
Figure 2D:
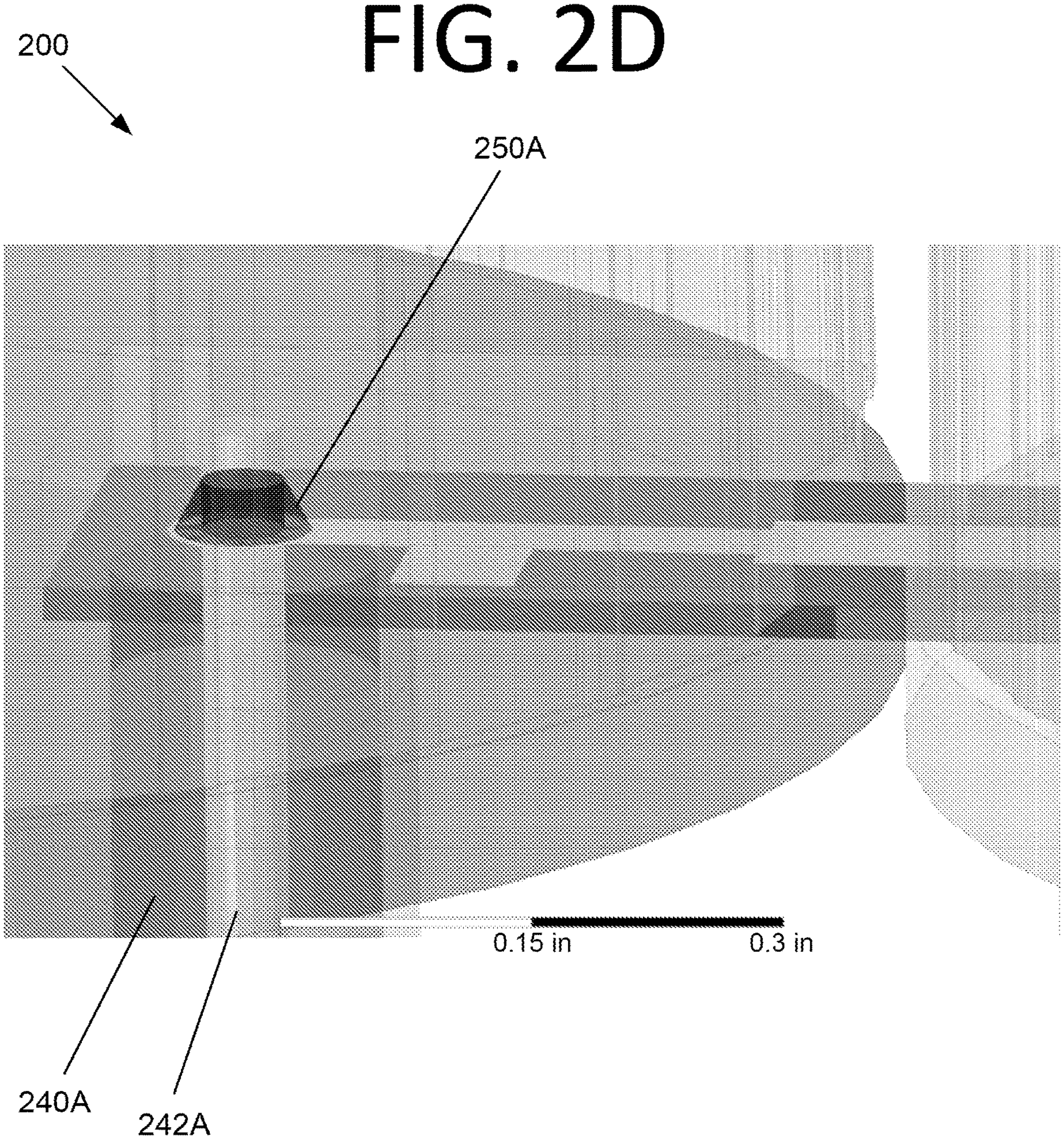
FIG. 2D is a partially transparent perspective view illustrating the portion of the pair of unit cells showing the black conical solder joint between the microstrip line and the gray cylindrical coaxial probe, according to an embodiment of the present invention.

A microstrip 250 connects unit cells 200A, 200B and is attached to unit cell 200A by a solder joint 250A, which has a conical shape in this embodiment (see FIGS. 2C and 2D). Microstrip 250 includes a microstrip line 252 and a substrate 254. The end of microstrip line 252 and substrate 254 of microstrip 250 covered by ellipsoidal radiator 210B is short circuited by the perimeter of the ellipsoid of unit cell 200B.

For a transmitting antenna in this embodiment, the fields are input into the bottom of the coaxial connector (e.g., coaxial connector 240A) and propagate through the short 50 Ohm coaxial section, and transition to 50 Ohm microstrip line 252, which excites the fields in the gap between ellipsoidal radiators 210A, 210B of unit cells 200A, 200B, respectively. The fields then propagate upward and are well contained between the three dimensional (3D) ellipsoidal surfaces until they launch into free space.

The highest field strength in the vacuum/air region is in the gap between ellipsoidal radiators 210A, 210B just below substrate 254. Some embodiments include a chamfer on the lower edge of upper cylinder 220A, 220B that does not change the minimum gap seen by microstrip line 252 and does not impact the impedance of the antenna, but does increase the multipactor threshold by eliminating parallel plates that constrain high field strengths.

Figure 3A:
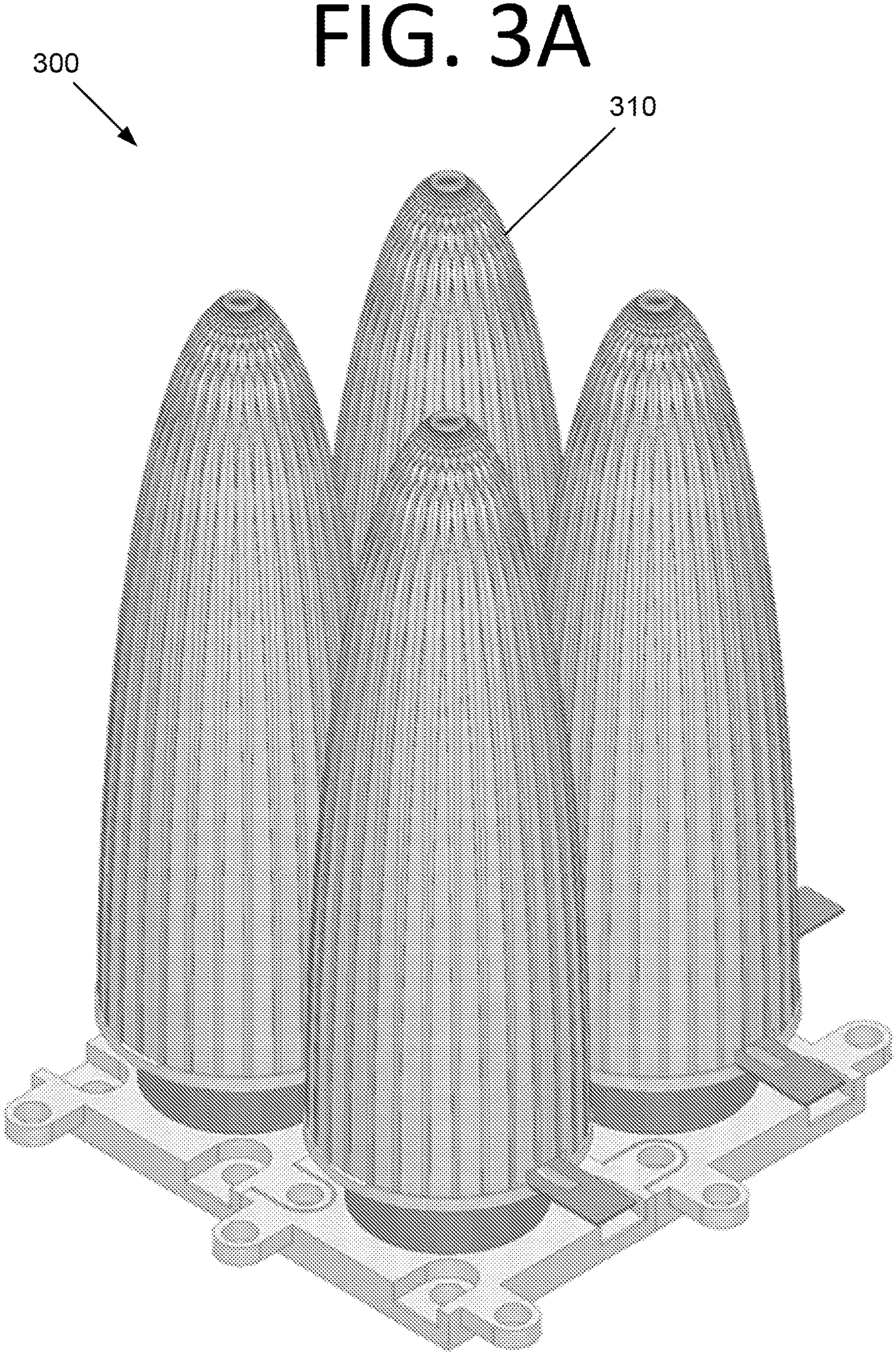
FIG. 3A is a perspective view illustrating a dual polarized antenna array with two dual polarized elements and four unit cells, according to an embodiment of the present invention.
Figure 3B:
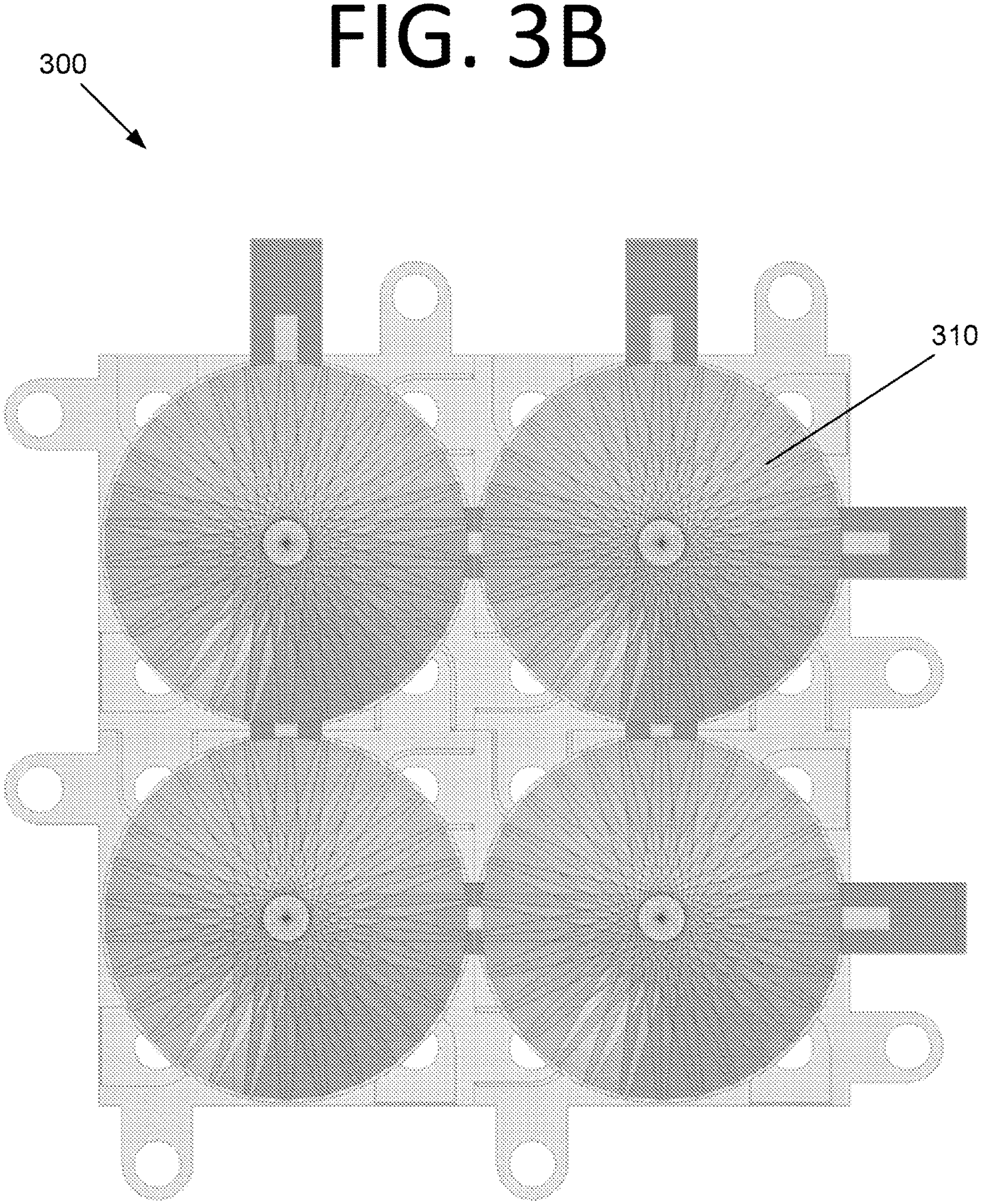
FIG. 3B is a top view illustrating the dual polarized antenna array with two dual polarized elements and four unit cells, according to an embodiment of the present invention.
Figure 4A:
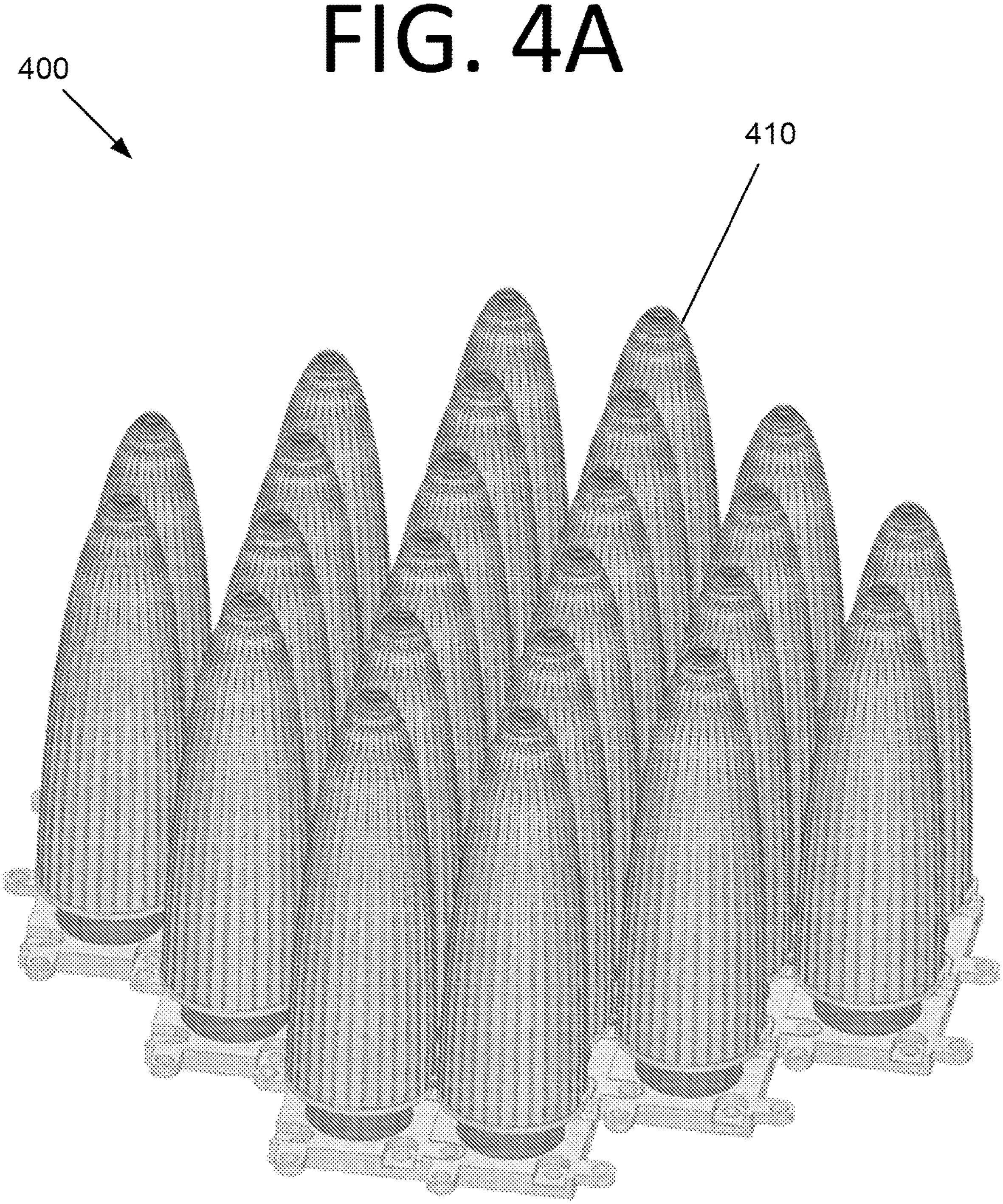
FIG. 4A is a perspective view illustrating a dual polarized antenna array configured in a diagonal arrangement of 19 antenna elements and including 24 unit cells.
Figure 4B:
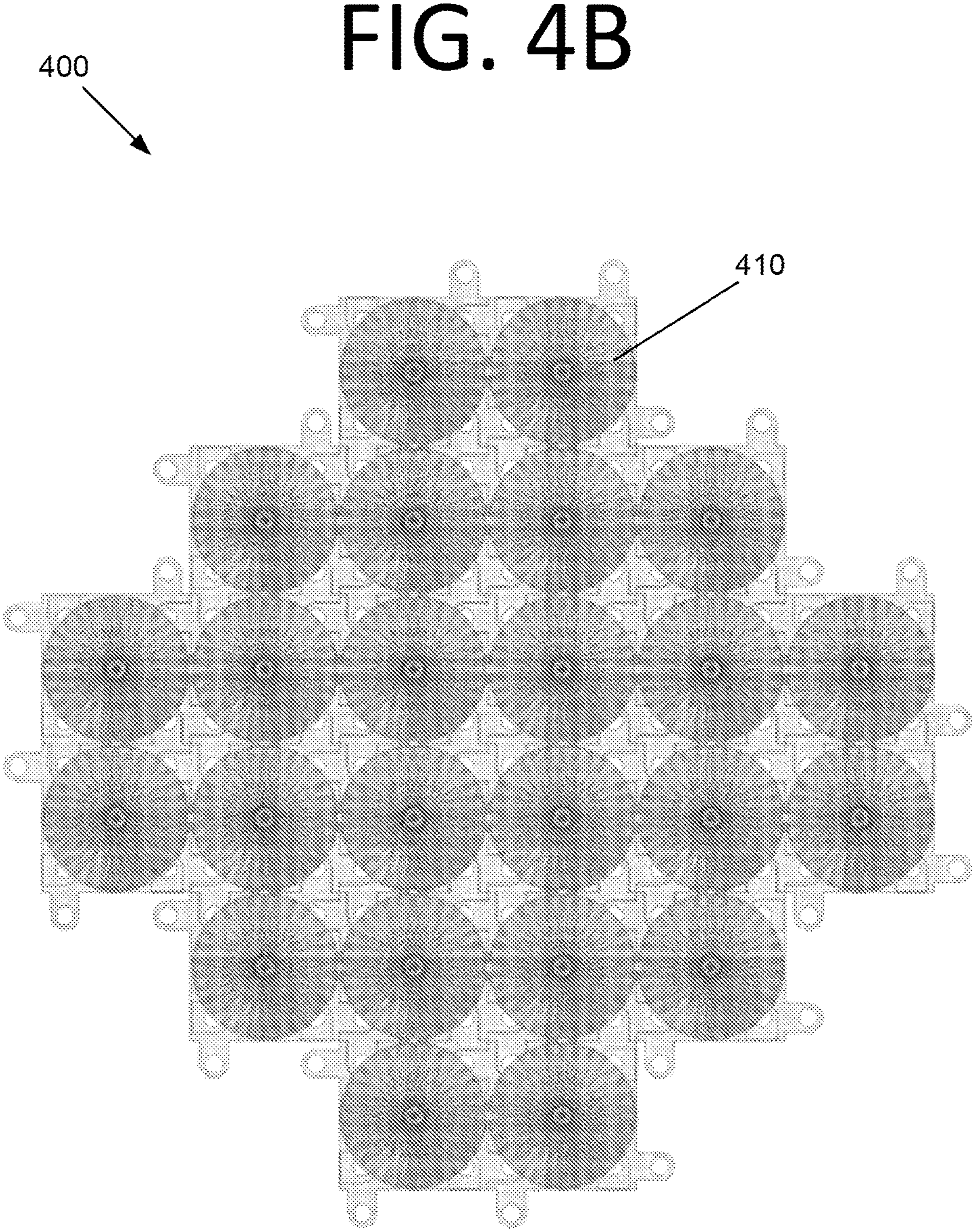
FIG. 4B is a top view illustrating the dual polarized antenna array configured in a diagonal arrangement of 19 antenna elements and including 24 unit cells.
Figure 4C:
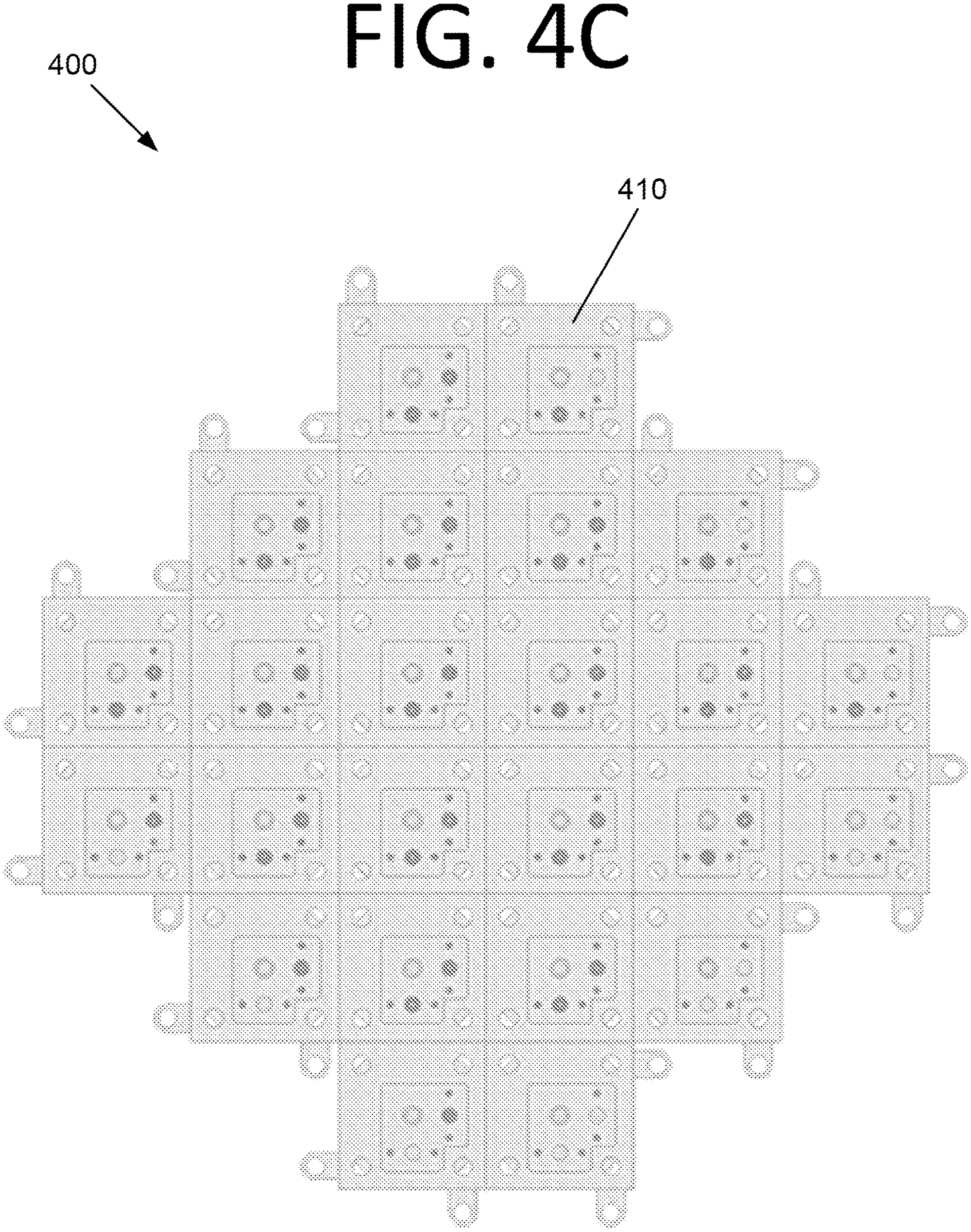
FIG. 4C is a bottom view illustrating the dual polarized antenna array configured in a diagonal arrangement of 19 antenna elements and including 24 unit cells.
Figure 5A:
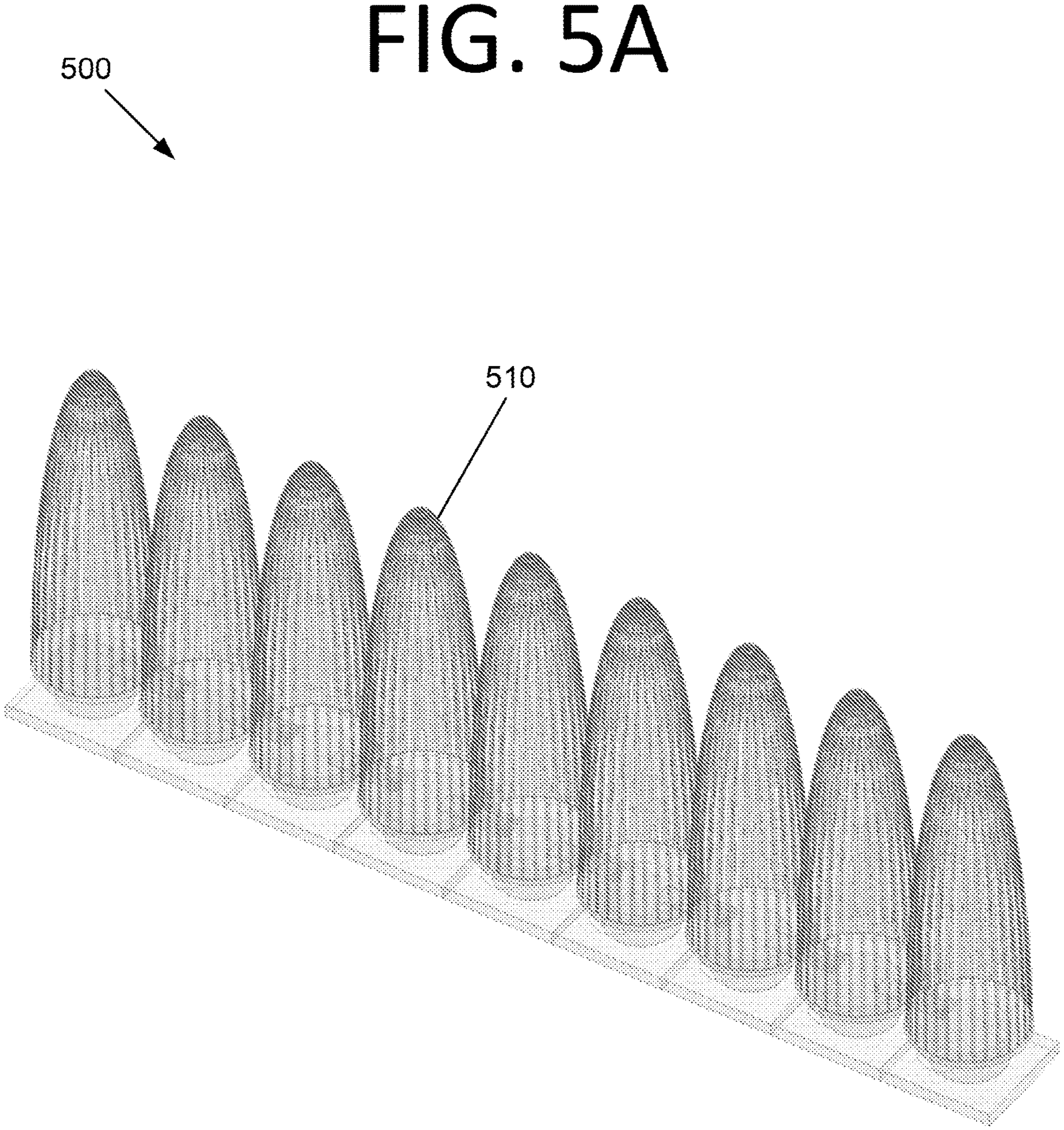
FIG. 5A is a perspective view illustrating a 1×8 element antenna array including 9 unit cells, according to an embodiment of the present invention.
Figure 5B:
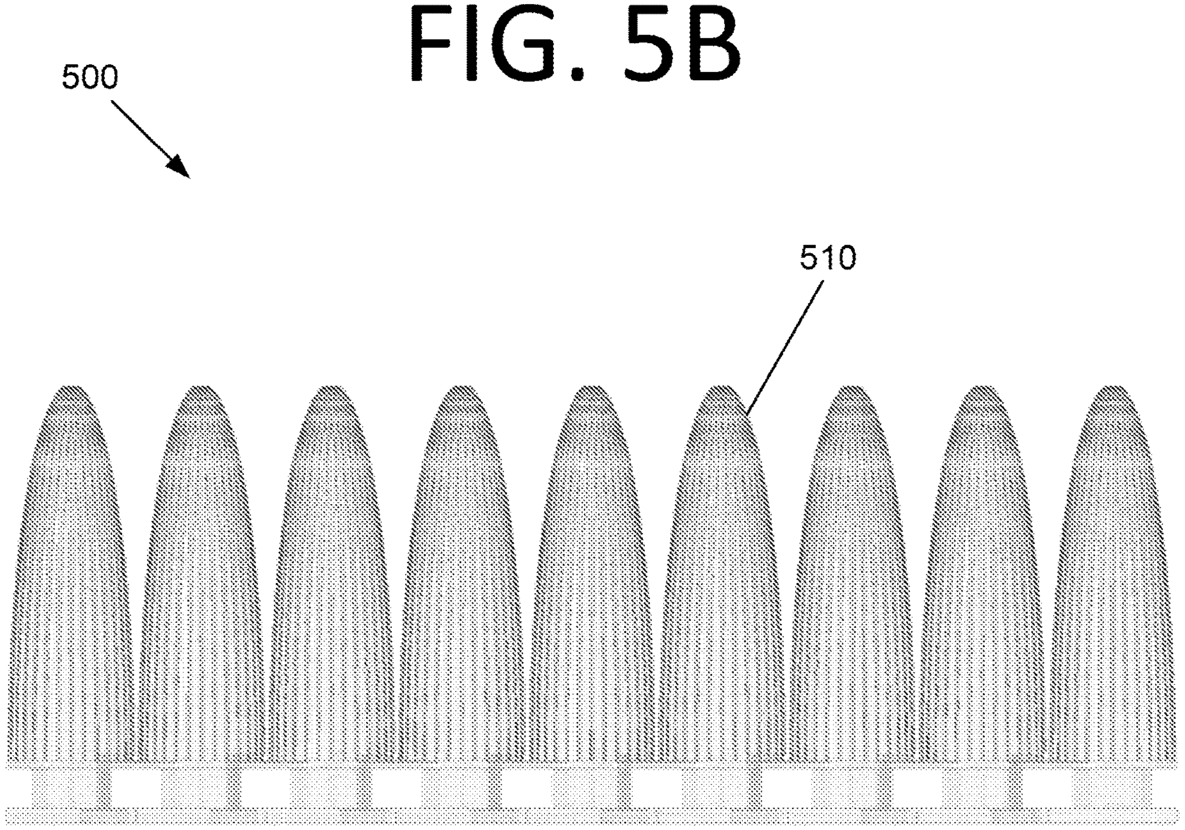
FIG. 5B is a side view illustrating the 1×8 element antenna array including 9 unit cells, according to an embodiment of the present invention.
Figure 5C:
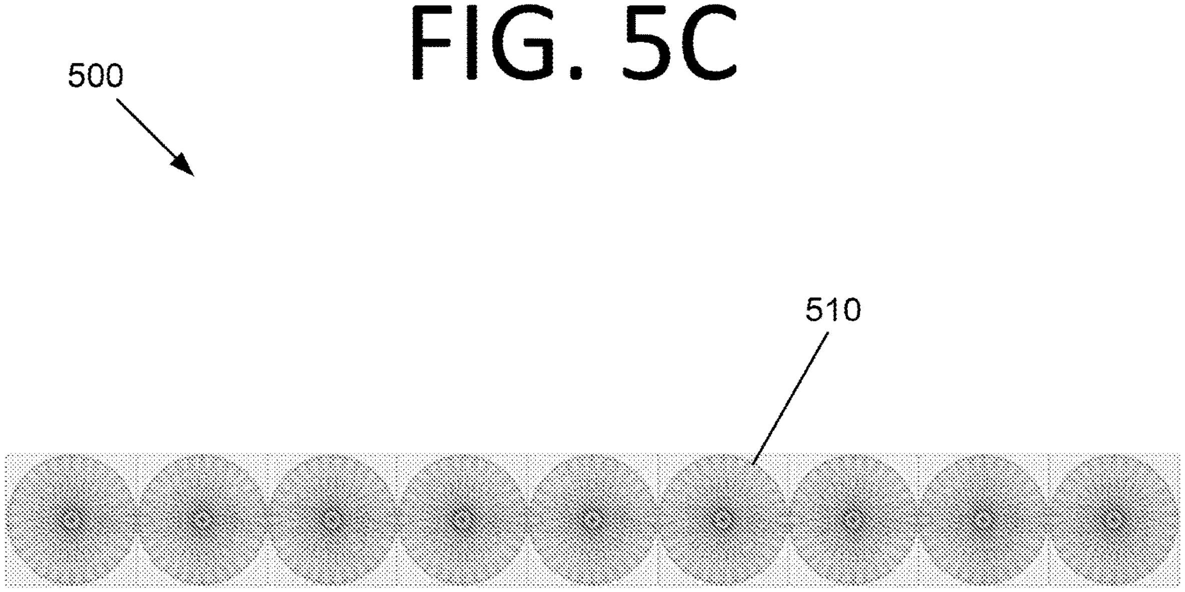
FIG. 5C is a top view illustrating the 1×8 element antenna array including 9 unit cells, according to an embodiment of the present invention.

Various antenna configurations are possible. For instance, FIGS. 3A and 3B show a dual polarized antenna array 300 with two dual polarized elements and four unit cells 310. FIGS. 4A-C show a dual polarized antenna array 400 configured in a diagonal arrangement of 19 antenna elements and including 24 unit cells 410. FIGS. 5A-C show a 1×8 element antenna array 500 including 9 unit cells 510. It will be clear to one skilled in the art from this disclosure that the modularity of the unit cell design facilitates scalable and extensible antenna array designs made from a plurality of identical or similar unit cells. Many such designs may be envisioned and implemented without deviating from the scope of the invention.

Figure 6A:
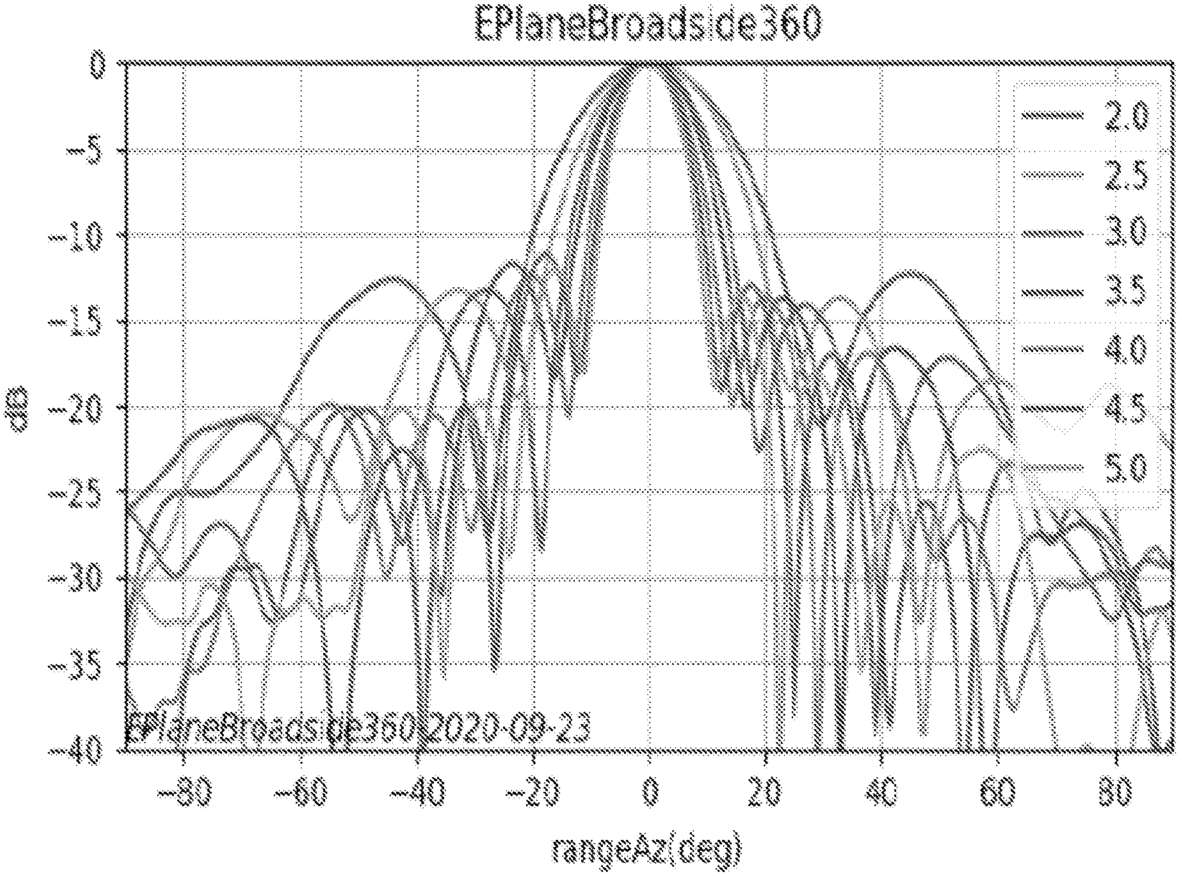
FIG. 6A is a graph illustrating radiation pattern cuts for a 1×8 element antenna array, such as that of FIG. 5, with uniform phase and amplitude distribution producing no beam scan, according to an embodiment of the present invention.

FIG. 6A is a graph 600 illustrating radiation pattern cuts for a 1×8 element antenna array, such as that of FIGS. 5A-C, with uniform phase and amplitude distribution producing no beam scan, according to an embodiment of the present invention. A beam peak at broadside to the array (zero degrees of scan) is expected when the antenna elements are excited with the same phase. The beams of some array antennas do scan off boresight when operating over a wide frequency band.

Figure 6B:
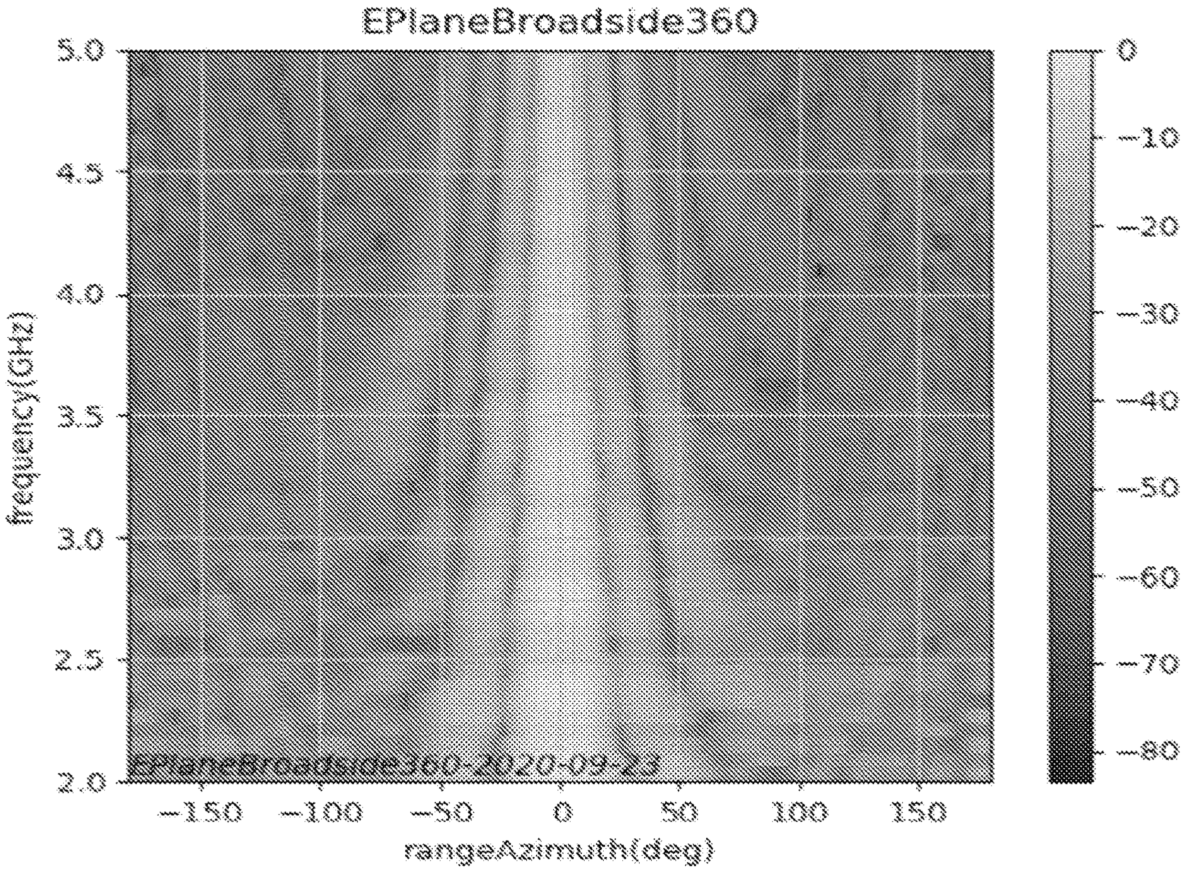
FIG. 6B is a raster plot illustrating relative gain vs. frequency and azimuth angle under the same conditions above with respect to FIG. 6A, according to an embodiment of the present invention.

FIG. 6B is a raster plot 610 illustrating relative gain vs. frequency and azimuth angle under the same conditions above with respect to FIG. 6A, according to an embodiment of the present invention. This raster scan was measured on a prototype antenna at a very fine frequency and angular resolution. The gradual change in beamwidth and fixed beam pointing angle are very predictable in this antenna.

Figure 7A:
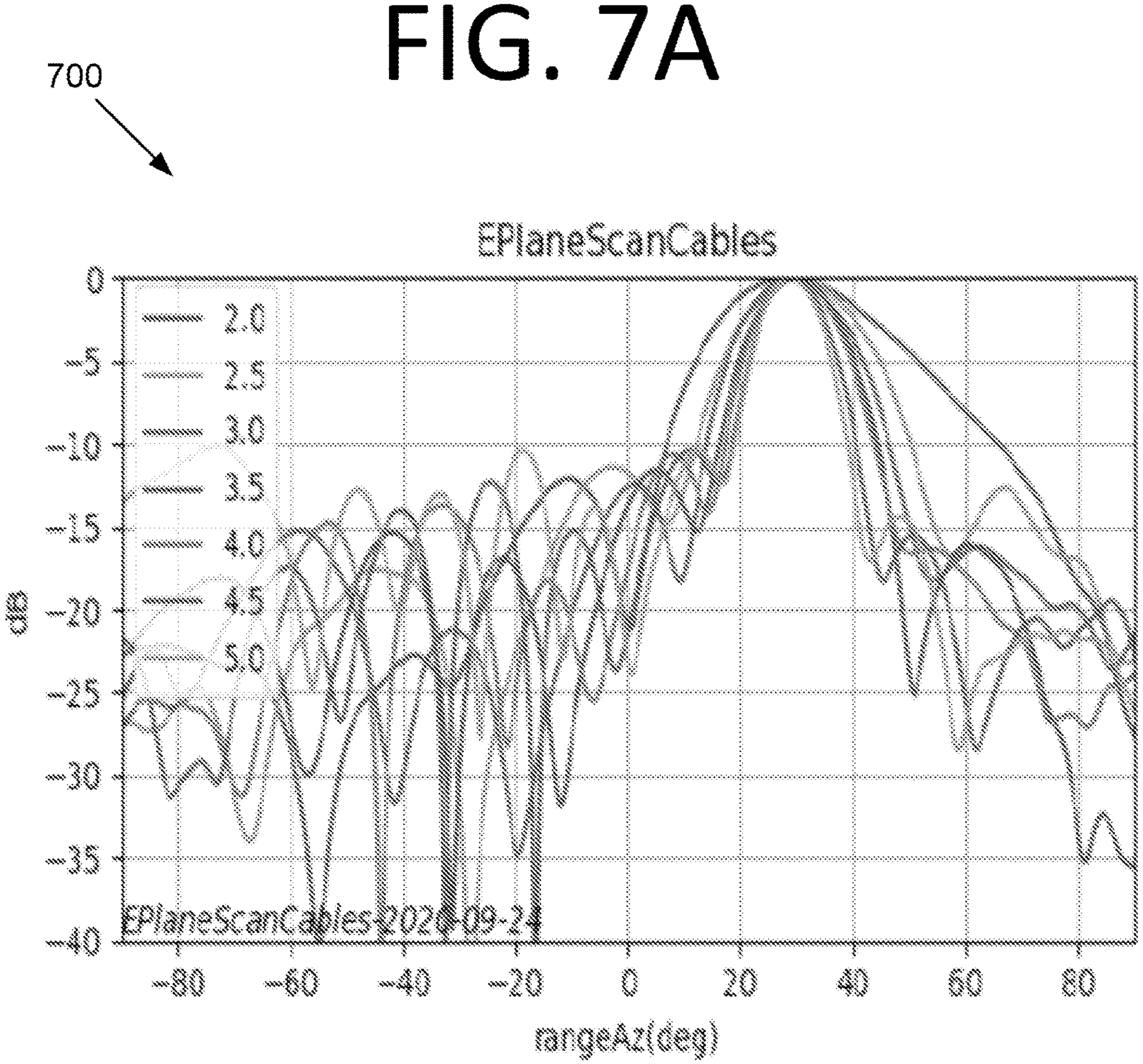
FIG. 7A is a graph illustrating radiation pattern cuts for a 1×8 element antenna array using true time delay devices to produce a constant 30° scan angle over a full octave bandwidth, according to an embodiment of the present invention.

FIG. 7A is a graph 700 illustrating radiation pattern cuts for a 1×8 element antenna array using true time delay devices to produce a constant 30° scan angle over a full octave bandwidth, according to an embodiment of the present invention. The amplitude distribution across the array is constant while an incremental time delay is applied to scan the beam. The ellipsoidal array can be scanned to a fixed angle across the entire bandwidth. This is an important capability in wideband array antennas and ensures that the performance is predictable.

Figure 7B:
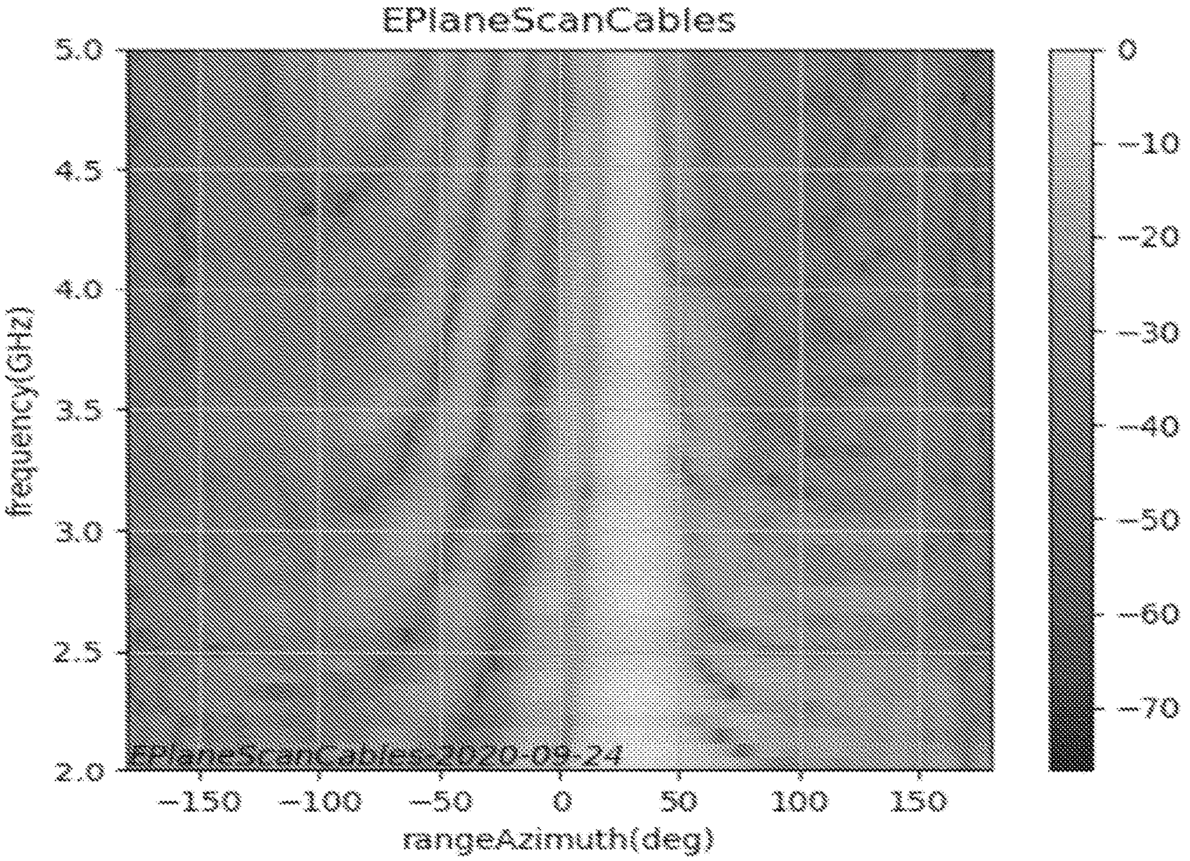
FIG. 7B is raster plot illustrating relative gain vs. frequency and azimuth angle using true time delay devices under the same conditions above with respect to FIG. 7A, according to an embodiment of the present invention.

FIG. 7B is raster plot 710 illustrating relative gain vs. frequency and azimuth angle using true time delay devices under the same conditions above with respect to FIG. 7A, according to an embodiment of the present invention. Raster plot 710 indicates that the radiation pattern performance is well behaved across the entire bandwidth and overcomes many of the issues of existing antenna arrays discussed above. This raster scan was measured on a prototype antenna at a very fine frequency and angular resolution. The gradual change in beamwidth and fixed beam pointing angle are very predictable in this antenna. The beam of some wideband antennas can move back and forth in angle with frequency and is an undesirable trait. The ellipsoidal array holds a very stable beam pointing angle with frequency. This is beneficial for communications, radar, and many other types of applications.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An ellipsoidal antenna unit cell, comprising:
- an ellipsoidal radiator comprising a coaxial connector center conductor and a radio frequency (RF) conductor;
- a cylinder located below and operably connected to the ellipsoidal radiator; and
- a first connector that originates from between the ellipsoidal radiator and the cylinder, wherein
- the first connector is operably connected to the coaxial connector center conductor and the RF conductor,
- the first connector extends beyond a width of the ellipsoidal antenna unit cell, and
- the first connector is configured to connect the ellipsoidal antenna unit cell to another ellipsoidal antenna unit cell.

2. The ellipsoidal antenna unit cell of claim 1, further comprising:
- a unit cell ground plane operably connected to the cylinder.

3. The ellipsoidal antenna unit cell of claim 2, wherein the cylinder comprises further comprising:
- a lower cylinder operably connected to the unit cell ground plane and supporting mounting of the RF connector; and
- an upper cylinder operably connected to the lower cylinder and the ellipsoidal radiator.

4. The ellipsoidal antenna unit cell of claim 2, wherein the unit cell ground plane is shared by the ellipsoidal antenna unit cell and at least one other ellipsoidal antenna unit cell.

5. The ellipsoidal antenna unit cell of claim 2, wherein a difference between a width of the ellipsoidal radiator and the unit cell ground plane defines a smallest gap between the modular ellipsoidal antenna unit cell and an adjacent ellipsoidal antenna unit cell at a location of a feed point of the first connector.

6. The ellipsoidal antenna unit cell of claim 2, wherein the unit cell ground plane comprises a plurality of flanges with respective recesses that facilitate connection of the ellipsoidal antenna unit cell to one or more other ellipsoidal antenna unit cells.

7. The ellipsoidal antenna unit cell of claim 1, wherein the cylinder comprises through holes through which the coaxial connector center conductor and the RF conductor pass.

8. The ellipsoidal antenna unit cell of claim 1, wherein the cylinder is smaller in diameter than the ellipsoidal radiator, forming part of a cavity that is completed when multiple one or more additional ellipsoidal antenna unit cells are combined with the ellipsoidal antenna unit cell.

9. The ellipsoidal antenna unit cell of claim 1, wherein the first connector is a microstrip feed, a coaxial cable, or a strip line.

10. The ellipsoidal antenna unit cell of claim 1, wherein
- the first connector is a microstrip, and
- the microstrip comprises a microstrip line and a substrate.

11. The ellipsoidal antenna unit cell of claim 10, wherein a width of a portion of the microstrip line that exits a perimeter of the ellipsoidal radiator is larger than a width of a portion of the microstrip line that is within the ellipsoidal radiator to reduce residual parasitic inductance as the microstrip line crosses a gap to the another ellipsoidal antenna unit cell.

12. The ellipsoidal antenna unit cell of claim 1, further comprising:
- a second connector that originates from between the ellipsoidal radiator and the cylinder, wherein
- the ellipsoidal radiator comprises another RF conductor,
- the second connector is operably connected to the coaxial connector center conductor and the another RF conductor, and
- the second connector is configured to connect the ellipsoidal antenna unit cell to yet another ellipsoidal antenna unit cell.

13. The ellipsoidal antenna unit cell of claim 1, wherein the ellipsoidal antenna unit cell is a component of an array antenna with bandwidths exceeding one octave.

14. The ellipsoidal antenna unit cell of claim 13, wherein a power of the array antenna is greater than 200 watts and has a cross-polarization rejection of greater than 25 decibels.

15. The ellipsoidal antenna unit cell of claim 1, wherein the ellipsoidal antenna unit cell is one of a plurality of identical ellipsoidal antenna unit cells of a single polarized array antenna or a dual polarized array antenna.

16. The ellipsoidal antenna unit cell of claim 1, wherein a connection between the ellipsoidal antenna unit cell and an adjacent ellipsoidal antenna unit cell facilitated by the first connector is short circuited.

17. The ellipsoidal antenna unit cell of claim 1, wherein a connection between the ellipsoidal antenna unit cell and an adjacent ellipsoidal antenna unit cell facilitated by the first connector is open circuited.

18. A modular ellipsoidal antenna unit cell, comprising:
- an ellipsoidal radiator comprising a coaxial connector center conductor and a radio frequency (RF) conductor;
- a cylinder located below and operably connected to the ellipsoidal radiator;
- a unit cell ground plane operably connected to the cylinder; and
- a first connector that originates from between the ellipsoidal radiator and the cylinder, wherein
- the first connector is operably connected to the coaxial connector center conductor and the RF conductor,
- the first connector extends beyond a width of the modular ellipsoidal antenna unit cell,
- the first connector is configured to connect the modular ellipsoidal antenna unit cell to another modular ellipsoidal antenna unit cell, and a difference between a width of the ellipsoidal radiator and the unit cell ground plane defines a smallest gap between the modular ellipsoidal antenna unit cell and an adjacent modular ellipsoidal antenna unit cell at a location of a feed point of the first connector.

19. The modular ellipsoidal antenna unit cell of claim 18, wherein the unit cell ground plane comprises a plurality of flanges with respective recesses that facilitate connection of the modular ellipsoidal antenna unit cell to one or more other modular ellipsoidal antenna unit cells.

20. The modular ellipsoidal antenna unit cell of claim 18, wherein the cylinder is smaller in diameter than the ellipsoidal radiator, forming part of a cavity that is completed when multiple one or more additional ellipsoidal antenna unit cells are combined with the ellipsoidal antenna unit cell.

21. The modular ellipsoidal antenna unit cell of claim 18, wherein the first connector is a microstrip feed, a coaxial cable, or a strip line.

22. The modular ellipsoidal antenna unit cell of claim 18, further comprising:

a second connector that originates from between the ellipsoidal radiator and the cylinder, wherein the ellipsoidal radiator comprises another RF conductor, the second connector is operably connected to the coaxial connector center conductor and the another RF conductor, and the second connector is configured to connect the modular ellipsoidal antenna unit cell to yet another modular ellipsoidal antenna unit cell.

23. An ellipsoidal antenna unit cell, comprising:

an ellipsoidal radiator comprising a coaxial connector center conductor, a first radio frequency (RF) conductor, and a second RF conductor;

a cylinder located below and operably connected to the ellipsoidal radiator; and a first connector and a second connector, the first connector and the second connector originating from between the ellipsoidal radiator and the cylinder, wherein the first connector and the second connector are operably connected to the coaxial connector center conductor and to the first RF conductor and the second RF conductor, respectively, the first connector and the second connector extend beyond a width of the ellipsoidal antenna unit cell, the first connector is configured to connect the ellipsoidal antenna unit cell to another ellipsoidal antenna unit cell, and the second connector is configured to connect the ellipsoidal antenna unit cell to yet another ellipsoidal antenna unit cell.

24. The ellipsoidal antenna unit cell of claim 23, further comprising:

a unit cell ground plane operably connected to the cylinder.

25. The ellipsoidal antenna unit cell of claim 24, wherein a difference between a width of the ellipsoidal radiator and the unit cell ground plane defines a smallest gap between the modular ellipsoidal antenna unit cell and an adjacent ellipsoidal antenna unit cell at a location of a feed point of the first connector.

26. The ellipsoidal antenna unit cell of claim 24, wherein the unit cell ground plane comprises a plurality of flanges with respective recesses that facilitate connection of the ellipsoidal antenna unit cell to one or more other ellipsoidal antenna unit cells.

27. The ellipsoidal antenna unit cell of claim 23, wherein the cylinder is smaller in diameter than the ellipsoidal radiator, forming part of a cavity that is completed when multiple one or more additional ellipsoidal antenna unit cells are combined with the ellipsoidal antenna unit cell.

28. The ellipsoidal antenna unit cell of claim 23, wherein the first connector is a microstrip feed, a coaxial cable, or a strip line.

* * * * *